(12) United States Patent
Nakatsu et al.

(10) Patent No.: US 10,912,159 B2
(45) Date of Patent: Feb. 2, 2021

(54) INDUCTION HEATING DEVICE, INDUCTION HEATING EQUIPMENT, INDUCTION HEATING METHOD, AND HEAT TREATMENT METHOD

(71) Applicant: NETUREN CO., LTD., Tokyo (JP)

(72) Inventors: Hitoshi Nakatsu, Tokyo (JP); Masato Yoshioka, Tokyo (JP); Yoshimasa Tanaka, Tokyo (JP); Tsutomu Ito, Tokyo (JP); Kenji Koyanagi, Tokyo (JP); Masaki Sagae, Tokyo (JP); Tatsuya Ishii, Tokyo (JP); Yoshitaka Misaka, Tokyo (JP); Yasuharu Ogawa, Tokyo (JP)

(73) Assignee: NETUREN CO., LTD., Tokyo (JP)

(*) Notice: Subject to any disclaimer, the term of this patent is extended or adjusted under 35 U.S.C. 154(b) by 192 days.

(21) Appl. No.: 16/037,761

(22) Filed: Jul. 17, 2018

(65) Prior Publication Data

US 2018/0332672 A1 Nov. 15, 2018

Related U.S. Application Data

(62) Division of application No. 14/110,410, filed as application No. PCT/JP2012/059607 on Apr. 6, 2012, now Pat. No. 10,057,945.

(30) Foreign Application Priority Data

Apr. 7, 2011 (JP) .................................. 2011-085129
Apr. 7, 2011 (JP) .................................. 2011-085130
(Continued)

(51) Int. Cl.
*H05B 6/06* (2006.01)
*H05B 6/40* (2006.01)
(Continued)

(52) U.S. Cl.
CPC .................. *H05B 6/40* (2013.01); *H05B 6/06* (2013.01); *H05B 6/101* (2013.01); *H05B 6/44* (2013.01)

(58) Field of Classification Search
CPC .......... H05B 6/06; H05B 6/101; H05B 6/102; H05B 6/36; H05B 6/40; H05B 6/44
(Continued)

(56) References Cited

U.S. PATENT DOCUMENTS 2,643,325 A * 6/1953 Body ........................ C21D 9/28
219/652
2,845,377 A 7/1958 Seulen et al.
(Continued)

FOREIGN PATENT DOCUMENTS

JP 63-042830 B2 8/1988
JP 63-238212 A 10/1988
(Continued)

OTHER PUBLICATIONS

International Search Report of PCT/JP2012/059607, dated Jul. 10, 2012.
(Continued)

*Primary Examiner* — Hung D Nguyen
(74) *Attorney, Agent, or Firm* — Westerman, Hattori, Daniels & Adrian, LLP

(57) ABSTRACT

An induction heating device and an induction heating method are provided. The entire areas to be heated of the workpiece can be uniformly heated to a predetermined high temperature, and uniform heating is possible even when the workpiece deforms in a non-uniform manner during heating. When areas to be heated are established on a workpiece so as to extend in one direction and the areas to be heated are induction-heated, the deformation amount on one edge of the areas to be heated is different from that on the other. This
(Continued)

induction heating device includes; heating coils facing a portion of the areas to be heated when the workpiece is induction-heated; and a relative transfer means for transferring the workpiece and the heating coils along one direction in a relative manner, and the heating coils are disposed so as to correspond to the areas to be heated during the heating period.

2 Claims, 23 Drawing Sheets

(30) Foreign Application Priority Data

| Apr. 7, 2011 | (JP) | 2011-085131 |
| Apr. 7, 2011 | (JP) | 2011-085132 |
| May 31, 2011 | (JP) | 2011-122977 |

(51) Int. Cl.
  *H05B 6/10* (2006.01)
  *H05B 6/44* (2006.01)
  *H05B 6/04* (2006.01)

(58) Field of Classification Search
  USPC ....... 219/632, 635, 640, 642, 650, 652, 662, 219/671, 672, 676
  See application file for complete search history.

(56) References Cited

U.S. PATENT DOCUMENTS

| 2010/0163551 | A1 | 7/2010 | Minoue et al. |
| 2010/0243643 | A1 | 9/2010 | Cesano et al. |
| 2011/0248023 | A1* | 10/2011 | Doyon ............... C22C 37/00 219/632 |
| 2012/0125919 | A1 | 5/2012 | Tanaka et al. |

FOREIGN PATENT DOCUMENTS

| JP | 2001-226717 A | 8/2001 |
| JP | 2005-325409 A | 11/2005 |
| JP | 2008-71701 A | 3/2008 |
| JP | 2008-202099 A | 9/2008 |
| JP | 2008202099 A * | 9/2008 |
| JP | 2009-287074 A | 12/2009 |

OTHER PUBLICATIONS

Office Action dated Feb. 10, 2015, issued in counterpart Japanese Patent Application No. 2011-085130 (2 pages).
Office Action dated Feb. 10, 2015, issued in counterpart Japanese Patent Application No. 2011-085131 (3 pages).
Office Action dated Feb. 10, 2015, issued in counterpart Japanese Patent Application No. 2011-085132 (3 pages).
Supplementary European Search Report dated Apr. 20, 2017, issued in counterpart European Application No. 16197529.7. (3 pages).

* cited by examiner

FIG.12

Step data setting screen

| Step | Time Second | Work rotation speed mm/sec. | First heating coil Power kW | First heating coil Voltage V | Switching of matching circuits |
|---|---|---|---|---|---|
| 1 | 5 | | | | |
| 2 | 150 | | | | |
| 3 | 0.5 | | | | |
| 4 | 1 | | | | With |
| 5 | 30 | | | | |
| 6 | 30 | | | | |
| 7 | 0.4 | | | | |
| 8 | 15 | | | | |
| 9 | 0 | | | | |
| 10 | 0 | | | | |

Setting complete

| 7 | 8 | 9 |
|---|---|---|
| 4 | 5 | 6 |
| 1 | 2 | 3 |
| 0 | . | CLR |

| Circuit setting condition | | | |
|---|---|---|---|
| Matching circuit 1 | Use | | |
| Selection of MTR | 1300V | 1200V | 1100V |
| | 1000V | 900V | 850V |
| Selection of capacitor | ○○μF | ○○μF | ○○μF |
| | ○○μF | ○○μF | ○○μF |
| Selection of inversion control unit | HI1 | MID1 | LOW1 |
| | HI2 | MID2 | LOW2 |
| After switching | | | |
| Matching circuit 1 | Use | | |
| Selection of MTR | 1300V | 1200V | 1100V |
| | 1000V | 900V | 850V |
| Selection of capacitor | ○○μF | ○○μF | ○○μF |
| | ○○μF | ○○μF | ○○μF |
| Selection of inversion control unit | HI1 | MID1 | LOW1 |
| | HI2 | MID2 | LOW2 |

▲ ▼  Setting complete

| ▲ | ▼ | |
|---|---|---|
| 7 | 8 | 9 |
| 4 | 5 | 6 |
| 1 | 2 | 3 |
| 0 | . | CLR |

FIG.20
(a) 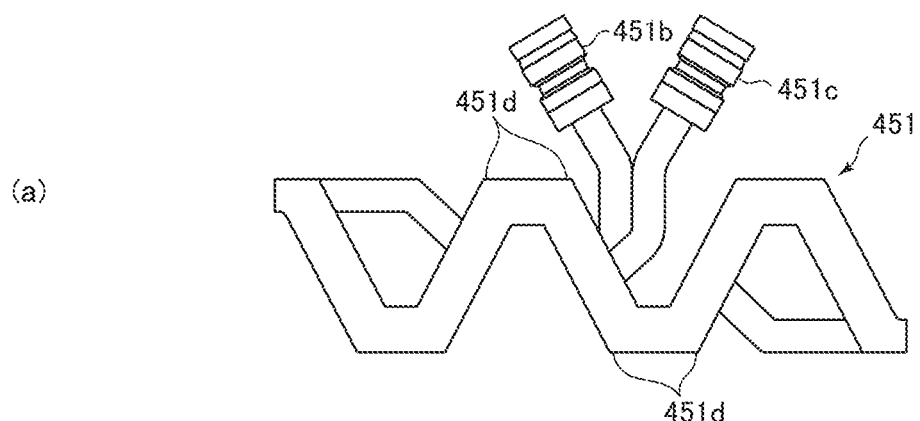
(b) 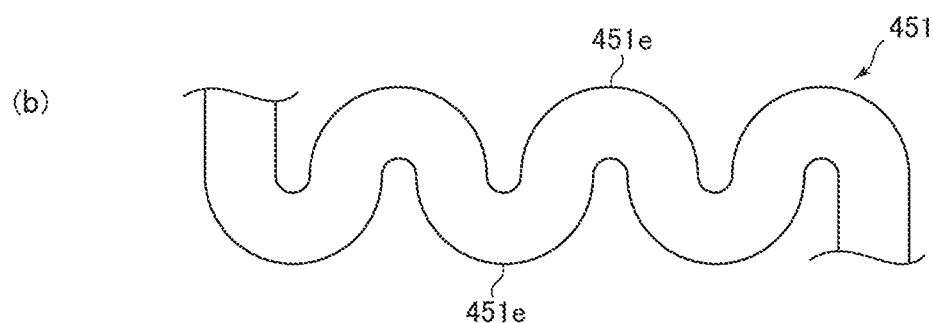
(c) 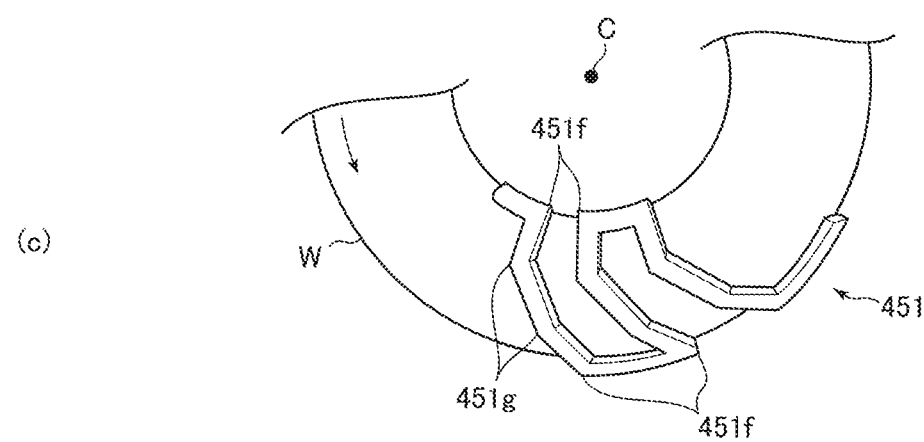

INDUCTION HEATING DEVICE, INDUCTION HEATING EQUIPMENT, INDUCTION HEATING METHOD, AND HEAT TREATMENT METHOD

This application is a divisional of U.S. application Ser. No. 14/110,410 filed on Jan. 13, 2014, which is a continuation of International Application No. PCT/JP2012/059607 filed on Apr. 6, 2012.

TECHNICAL FIELD

The present invention relates to an induction heating device and induction heating equipment for heating a workpiece by induction heating, an induction heating method, and a heat treatment method.

BACKGROUND ART

Induction heating is performed for a workpiece where areas to be heated are established so as to extend in one direction. Heat treatment equipment such as follows has been proposed to heat a large workpiece in a shape of a ring, for example: heating coils are disposed so as to face a portion of areas to be heated extending in one direction on a workpiece, and by rotating the workpiece, for example, the entire length of the areas to be heated of this workpiece is heated.

The following Patent Reference 1 discloses high-frequency heat treatment equipment capable of heating a ring-shaped workpiece such as a large bearing ring. With this technique, a plurality of horseshoe-shaped heating coils are disposed at places along the circumferential direction of the ring-shaped workpiece, the induction heating is performed by the plurality of heating coils while the ring-shaped workpiece is being rotated, and after the heating, a cooling liquid is discharged from each of the horseshoe-shaped heating coils to rapidly cool the workpiece for heat treatment.

The following Patent Reference 2 discloses a device for performing induction heat treatment of the entire body of a ring-shaped piece. With this technique, positioning of the outside surface and inside surface of the ring-shaped piece is performed using a positioning roller, heating coils are disposed partially on the inner periphery, outer periphery, side face, etc. of the ring-shaped piece, the induction heating is performed while the ring-shaped piece is being rotated, and then rapid cooling is performed as heat treatment.

An induction heating device for applying electric power to heating coils as described below is generally used. Namely, such an induction heating device includes: an inverter for converting commercial power into direct current once and then converting it into alternating current having a predetermined frequency; a transformer including a primary winding connected to the inverter and a secondary winding; matching units connected in parallel to the primary winding of the transformer; and a heating coil connected to the secondary winding of the transformer. The heating coil and a workpiece are inductively coupled to ensure matching between the inverter and the heating coil.

The induction heating device disclosed in Patent Reference 3 is configured by connecting a capacitor and a matching transformer to a self-controlled thyristor inverter as a power supply, connecting a group of taps for selecting proper voltage and proper frequency at the time of increasing-temperature heating of an object to be heated, connecting another group of taps for selecting proper voltage and proper frequency at the time of constant-temperature heating of the object to be heated, and connecting each group of taps to a heating coil via a selector switch.

PRIOR ART REFERENCE

Patent Reference

Patent Reference 1: JP 2005-325409 A
Patent Reference 2: JP 2009-287074 A
Patent Reference 3: JP 1988-42830 B

DISCLOSURE OF INVENTION

Problems to be Solved by the Invention

However, with the heating devices adopting prior art induction heating, it was not easy to increase the temperature of areas to be heated to a desired level when a large workpiece was subjected to quenching. In the case of a large workpiece, disposing heating coils so that they face the entire areas to be heated increases costs significantly, and it is therefore infeasible. Therefore, there was no other choice but to use heating coils facing a portion of the areas to be heated. In this case, heating must be performed for a long time because the amount of steel with respect to the areas to be heated is large. In addition, the deformation amount due to thermal expansion of the workpiece increases with time, and consequently, optimum heating conditions cannot be maintained.

In particular, when areas of the workpiece to be heated extend in one direction, and the deformation amount that appears on one edge of the areas to be heated due to thermal expansion is different from that on the other, the workpiece deforms non-uniformly. Consequently, with large workpieces, it was difficult to increase the temperature of the entire areas to be heated uniformly to a predetermined high temperature using heating coils.

A first object of the present invention is to provide an induction heating device and an induction heating method that ensure facilitated and approximately uniform heating of the entire areas to be heated of a workpiece even if the workpiece is large, and also ensure uniform heating even if non-uniform deformation should occur during heating.

To subject a large workpiece having a radius of 1 m or larger, 3 m for example, to induction heating, the following method is adopted to heat the entire areas to be heated of the workpiece: a part of the areas to be heated of a workpiece is locally subjected to induction heating while the workpiece itself is rotated. In this case, since the temperature of the areas to be heated does not increase in several seconds, the heating time of several minutes is required.

However, if heating is performed for a long time, the output impedance viewed from the inverter changes with time, making it difficult for electric power to be applied from the inverter to the heating coils via matching units and transformers, and thus it becomes impossible to heat the workpiece to a predetermined temperature.

A second object of the present invention is to provide a heating device, heating equipment, and a heating method capable of increasing the temperature of a workpiece to a predetermined temperature by induction heating even if relatively long time is needed.

Conventionally, when performing heat treatment of a ring-shaped area to be heated, the entire surface of the workpiece or the entire area to be heated of the workpiece is heated collectively, and then the entire area is cooled rapidly as heat treatment. With such a heat treatment method, when a workpiece having a plurality of ring-shaped areas to be heated is subjected to heat treatment, for example, a large number of heating coils are required depending on the shape and the size of the workpiece because the plurality of areas to be heated are heated and cooled collectively. In addition, the shape and the structure of the heating coils and a work supporting structure, hence the device structure, become complicated.

Furthermore, with the structure where the plurality of areas to be heated are heated and cooled collectively, the areas to be heated using heating coils are large, and consequently, large power is required. In the case of a large workpiece, unless sufficient amount of power is fed, the temperature of the areas to be heated cannot be increased to a desired level. To feed sufficient amount of power, bulk power appropriate to the size of the workpiece is necessary, and thus the size of power supply facilities increases.

Meanwhile, if each of the areas to be heated of the workpiece having a plurality of ring-shaped areas to be heated is heated one by one, as a result of subjecting some areas to be heated to heat treatment, a structure different from that of other areas is formed on the workpiece endlessly. Consequently deformation tends to occur, causing heat treatment defects, such as hardening cracks and deformation, to occur after heat treatment. In the case of large workpieces, in particular, it was found that once such a transformation structure is generated in a local ring-shaped area, deformation and stress also increase with the increase of the size of the workpiece, thus causing heat treatment defects to occur easily.

A third object of the present invention is therefore to provide a heat treatment method that can be used to heat-treating a plurality of ring-shaped areas to be heated on a workpiece with a simple structure. A fourth object of the present invention is to provide a heat treatment method capable of preventing heat treatment defects from occurring when ring-shaped areas to be heated are set on a workpiece and each area is subjected to heat treatment.

Means for Solving Problem

In order to achieve the first object, the present invention provides a heating device for induction-heating a workpiece, on which areas to be heated are established extending in one direction, and when the areas to be heated are induction-heated, the side of one edge and the side of the other edge of the areas to be heated exhibit different deformation amounts, comprising: heating coils facing a portion of the areas to be heated; and a relative transfer means for transferring the workpiece and the heating coils along the direction in a relative manner, wherein the heating coils are disposed so as to correspond to the areas to be heated during heating period.

The inducting heating device to achieve the first object preferably further comprises: a displacing means for changing the orientation of the heating coils around a shaft along the direction in order that the surface of the heating coils facing the area to be heated follows the area to be heated during the heating period.

In the induction heating device to achieve the first object, the displacing means preferably further comprises: a posture control unit for controlling the operation of the displacing means in the displacing means so as to minimize or eliminating the difference in the angle between the surface of the heating coils facing the area to be heated and the area to be heated during the heating period, wherein the posture control unit includes: a setting input unit for inputting heating conditions of the workpiece; an arithmetic processing unit for calculating the relative angle between the surface of each heating coils facing the areas to be heated and the areas to be heated in set heating state of the areas to be heated; a heating state evaluating unit for evaluating that the heating state of the areas to be heated has reached the set heating state; and a driving control unit for driving the displacing means when the set heating state has been reached.

In the induction heating device to achieve the first object, the arithmetic processing unit calculates the relative angle in the set heating state by predetermined simulation processing based on the heating conditions, thereby calculating the angle between the surface of the heating coils facing the areas to be heated and the areas to be heated.

The induction heating device to achieve the first object, further comprises: a position detecting means for detecting surface positions of the workpiece other than the areas to be heated during the heating period; and a displacing means for displacing the relative position between the workpiece and the heating coils based on the detection result of the position detecting means, wherein the displacing means corrects measurement positions obtained by the detection result during the heating period based at least on the shape of the workpiece, and displaces the relative position between the workpiece and the heating coils so as to correspond to the corrected positions obtained by correction.

In the inducting heating device to achieve the first object, the measurement positions are measured as displacements from a reference position, the corrected positions are corrected displacements obtained by correcting the measured displacements, and it is preferable that the displacing means changes the relative position of the workpiece and the heating coils so that it corresponds to the corrected displacements.

In the induction heating device to achieve the first object, the displacing means is preferably provided with a posture control unit for controlling its operation of the displacing means in the displacing means, wherein the posture control unit corrects the measurement positions using a correction coefficient corresponding at least to the shape of the workpiece, thereby obtaining the corrected positions, and at the same time, controls the operation of the displacing means so as to correspond to the corrected positions.

In the induction heating device to achieve the first object, the posture control unit preferably comprises: a setting input unit for inputting the heating conditions of the workpiece; a storage unit for storing the correction coefficient in the set heating state of the areas to be heated; a heating state evaluating unit for evaluating that the heating state of the areas to be heated has reached the set heating state; an arithmetic processing unit for calculating the corrected positions from the measurement positions and the correction coefficient; and a driving control unit for driving the displacing means so as to correspond to the corrected positions.

In the induction heating device to achieve the first object, the arithmetic processing unit preferably calculates the correction. coefficient in the set heating state by the predetermined simulation. processing based on the heating conditions, and the storing unit preferably stores the correction coefficient obtained by the arithmetic processing unit by allowing it to correspond to the set heating state.

The induction heating method to achieve the first object, for induction-heating a workpiece where areas to be heated are established extending in one direction, the deformation amount that appears on one edge of the areas to be heated when the areas to be heated are induction-heated being different from that on the other, it comprises: a heating process for allowing heating coils to face a portion of the areas to be heated and for heating the workpiece using the heating coils while the workpiece and the heating coils are made to move along the direction in a relative manner, wherein the heating coils are disposed so as to follow the areas to be heated during heating period.

In the induction heating method to achieve the first object, it is preferable that the surface of the heating coils facing the areas to be heated is made to follow the areas to be heated during the heating period.

In the induction heating method to achieve the first object, it is preferable that further detecting surface positions of the workpiece other than the areas to be heated during the heating period; correcting measurement positions obtained by detection result based at least on the shape of the workpiece; and changing relative positions between the workpiece and the heating coils so as to correspond to corrected positions obtained by the correction.

Another induction heating device to achieve the first object is a heating device for induction-heating a workpiece, on which areas to be heated are established extending in one direction. The device comprises: a plurality of heating coils facing a portion of the areas to be heated; a relative transfer means for transferring the workpiece and the plurality of heating coils along the direction in a relative manner; and a displacing means for displacing the positions of the heating coils individually in the width direction of the areas to be heated, wherein the displacing means displaces each of the heating coils, thereby making adjustment so that the area where the plurality of heating coils and the areas to be heated face each other changes in the width direction of the areas to be heated, and heating the areas to be heated by the plurality of heating coils.

In yet another induction heating device to achieve the first object, wherein the deformation amount that appears on one edge of the areas to be heated of the workpiece when the areas to be heated are induction-heated is different from that on the other, further it comprises: a posture control unit for controlling the operation of the displacing means in the displacing means, wherein the posture control unit displaces the position of each of the heating coils corresponding to a gap between the areas to be heated and each of the heating coils during heating period.

Yet another induction heating device to achieve the first object is preferably equipped with a power adjusting means for individually adjusting high-frequency power to be supplied to the plurality of heating coils, and it is preferable that the displacing means adjusts the position of each of the heating coils, and the power adjusting means varies high-frequency power to be fed to each of the heating coils, thereby allowing the plurality of heating coils to heat the areas to be heated.

In yet another inducting heating device to achieve the first object, the posture control unit preferably comprises: a setting input unit for inputting heating conditions of the workpiece; an arithmetic processing unit for determining the disposition of the plurality of heating coils corresponding to the gap between the areas to be heated and the plurality of heating coils in assumed heating conditions of the areas to be heated; a heating state evaluating unit for evaluating that the heating state of the areas to be heated has reached the assumed heating state; and a driving control unit for driving the displacing means based on the disposition of the plurality of heating coils when the assumed heating state has been reached.

In yet another induction heating device to achieve the first object, the arithmetic processing unit may determine the disposition of the plurality of heating coils by calculating the gap in the assumed heating state by the predetermined simulation processing based on the heating conditions.

Another induction heating method to achieve the first object is a heating method for induction-heating a workpiece, on which areas to be heated are established, extending in one direction. The method comprises the step of: heating for allowing heating coils to face a portion of the areas to be heated, thereby heating the workpiece by the heating coils while the workpiece and the heating coils are made to move along the direction in a relative manner; and displacing the plurality of heating coils individually in the width direction of the areas to be heated during heating period, thereby making adjustment so that the area where the plurality of heating coils and the areas to be heated face each other changes in the width direction of the areas to be heated.

In order to achieve the second object, the present invention provides an induction heating device comprising: a plurality of transformers connected to heating coils in parallel; a plurality of matching units connected to any one of the plurality of transformers; an inverter unit having a rectifier unit for converting commercial power voltage to DC voltage, and an inverter unit for converting the DC voltage obtained by the rectifier unit into a voltage having a specified frequency; an inverter control unit having a rectification control unit for controlling the rectifier unit and a plurality inversion control unit for controlling the inverter unit, thereby obtaining voltages respectively having specified frequencies; a group of switches for connecting the heating coils to any one of the plurality of transformers, connecting any one of the plurality of transformers to any one of the plurality of matching units, connecting any one of the plurality of matching units to the inverter, and connecting any one of the plurality of inverter control units to the inverter unit; a setting unit for setting the frequency setting information on the voltage output from the inverter and selection information of matching circuits, namely combinations of selections of the plurality of matching units and the plurality of transformers, for each of the divisions obtained by dividing induction heating time into divisions, as induction heating conditions; and a switching control unit for selecting any one of the plurality of inversion control units to control the inverter unit and outputting a voltage having a specified frequency, connecting a matching unit to the inverter using the group of switches, connecting the matching unit to a transformer; and connecting the transformer to the heating coils, for each of the divisions in accordance with the induction heating conditions set by the setting unit.

In the induction heating device to achieve the second object, the inverter is preferably equipped with an impedance measuring unit for measuring output impedance in the inverter, and it is preferable that in an event the measurement result input from the impedance measurement unit exceeds the allowable range, the switching control unit selects any one of the plurality of inversion control units, and changes the frequency of the voltage output from the inverter and switches the group of switches, thereby ensuring impedance matching, by referring to conditions associated with the next division, of the induction heating conditions set in the setting unit.

Induction heating equipment to achieve the second object comprises: a plurality of induction heating devices disposed at intervals along the circumference of a ring-shaped workpiece; a setting unit for setting induction heating conditions;

and a switching control unit, wherein each of the plurality of induction heating devices comprises: heating coils disposed facing areas to be heated of the workpiece; a plurality of transformers connected to the heating coils in parallel; a plurality of matching units connected to any one of the plurality of transformers; an inverter unit having a rectifier unit for converting commercial power voltage to DC voltage and an inverter unit for converting the DC voltage obtained by the rectifier unit to a voltage having a specified frequency; an inverter control unit having a rectification control unit for controlling the rectifier unit and a plurality of inversion control units for controlling the inverter unit, thereby obtaining voltages having specified frequencies; and a group of switches for connecting the heating coils to any one of the plurality of transformers, connecting any one of the plurality of transformers to any one of the plurality of matching units, connecting any one of the plurality of matching units to the inverter, and connecting any one of the plurality of inversion control units to the inverter unit, wherein the setting unit sets frequency setting information on the voltage output from the inverter and the selection information of matching circuits, namely combinations of selections of the plurality of matching units and the plurality of transformers, for each of the induction heating devices, or for each of the divisions obtained by dividing induction heating time into a plurality of divisions, as induction heating conditions, and the switching control unit selects any one of the plurality of inversion control units, and controls the inverter unit, thereby outputting a voltage having a specified frequency, connects a matching unit to the inverter, connects the matching unit to a transformer, and connects the transformer to the heating coils by using the group of switches, for each of the induction heating devices and by the division, in accordance with the induction heating conditions set by the setting unit.

In order to achieve the second object, the present invention provides an induction heating method, comprising the step of: varying the frequency of induction current to be fed to the workpiece depending on the heating temperature or heating time of the workpiece when a workpiece is induction-heated while being moved; and changing the combinations of matching units and transformers in accordance with the change in frequency.

In order to achieve the second object, the present invention provides another induction heating method, comprising the step of: disposing a plurality of heating coils along a workpiece; varying the frequency of the induction current fed to the workpiece depending on the heating temperature or heating time of the workpiece when induction heating is performed by the plurality of heating coils while the workpiece is moved; and changing combinations of matching units and transformers depending on the change in frequency.

A heat treatment method in order to achieve the third and the fourth objects, the present invention provides a heat treatment method for providing a plurality of ring-shaped areas to be heated along a ring-shaped workpiece and performing heat treatment sequentially for each of the areas to be heated, comprising; a first heating process for heating a first area to be heated; a first cooling process for rapidly cooling the heated first area to be heated; a tempering process for heating and cooling the first area to be heated after the first cooling process is completed; and a second heating process for heating the second area to be heated after the tempering process is completed.

In the heat treatment method to achieve the third and the fourth object, it is preferable that the deformation amount that appears on one edge of the areas to be heated when the areas to be heated are heated is different from that on the other.

In the first heating process and the tempering process of the heat treatment method to achieve the third and the fourth objects, the first area to be heated is preferably induction-heated by using the same heating coils in the first heating process and the tempering process.

In the first heating process and the second heating process of the heat treatment method to achieve the third and the fourth objects, the first area to be heated and the second area to be heated are preferably induction-heated by using the same heating coils in the first heating process and the second heating process.

In the heat treatment method to achieve the third and the fourth objects, the first area to be heated and the second area to be heated preferably have plane-symmetrical shape, and the workpiece is preferably inverted after the tempering process.

Effect of Invention

According to the induction heating device and the inducting heating method to achieve the first object of the present invention, since the heating coils are disposed so as to correspond to the areas to be heated during heating period, or disposition/distribution of the plurality of heating coils in the width direction is adjusted, the temperature of the entire area to be heated can be increased uniformly to a designated temperature, even if the deformation amount that appears on one edge of the area to be heated when the workpiece is induction-heated is different from that on the other.

According to the induction heating device, induction heating equipment, and inducting heating method to achieve the second object of the present invention, by varying the frequency output from the inverter depending on the heating temperature or heating time of the workpiece, and at the same time by changing the combinations of the matching units and the transformers, impedance can be adjusted, and thus sufficient electric power can be supplied to the workpiece and the temperature can be increased to a desired level. In particular, impedance matching is ensured by increasing the temperature of the areas to be heated of the workpiece to suite the magnetic permeability.

According to the heat treatment method to achieve the third object of the present invention, since ring-shaped areas to be heated matching the shape of the workpiece are provided at a plurality of positions of the ring-shaped workpiece and the plurality of areas to be treated are sequentially subjected to heat treatment, heating can be performed using the heating unit having a configuration corresponding to the shape of the areas to be heated, regardless of the size and the shape of the workpiece. Consequently, the area to be heated can be heated using a simple heating unit that does not depend on the size or the shape of the workpiece, and thus a heat treatment method ensuring heat treatment using simple-structure heat treatment equipment can be provided.

Furthermore, according to this heat treatment method, when the ring-shaped areas to be heated matching the shape of the workpiece provided locally at the plurality of positions along the ring-shaped workpiece are sequentially subjected to heat treatment, the first area to be heated is subjected to heat treatment in the first heating process and in the first cooling process, the first area to be heated is heated and cooled in the subsequent tempering process, and then the second area to be heated is heated. Consequently, occurrence of heat treatment defects such as deformation and hardening cracks can be decreased or prevented during a period until the second area to be heated is heated or while heating is performed.

BRIEF DESCRIPTION OF DRAWINGS

In the drawings:

FIG. 12 is a chart schematically showing the step data setting screen that appears on the input/output screen of the operation unit of power feeding equipment;

FIG. 13 is a chart schematically showing the circuit setting condition setting screen that appears following the step data setting screen shown in FIG. 12;

FIG. 20 (a) is a front view of a heating coil of the heat treatment equipment according to the embodiment, (b) is a partial front view showing the shape of the part of the heating coil facing the workpiece in a variation of the heating coil, and (c) is a partial front view showing the shape of the part of the heating coil facing the workpiece in another variation;

MODES FOR CARRYING OUT THE INVENTION

Figure 1:
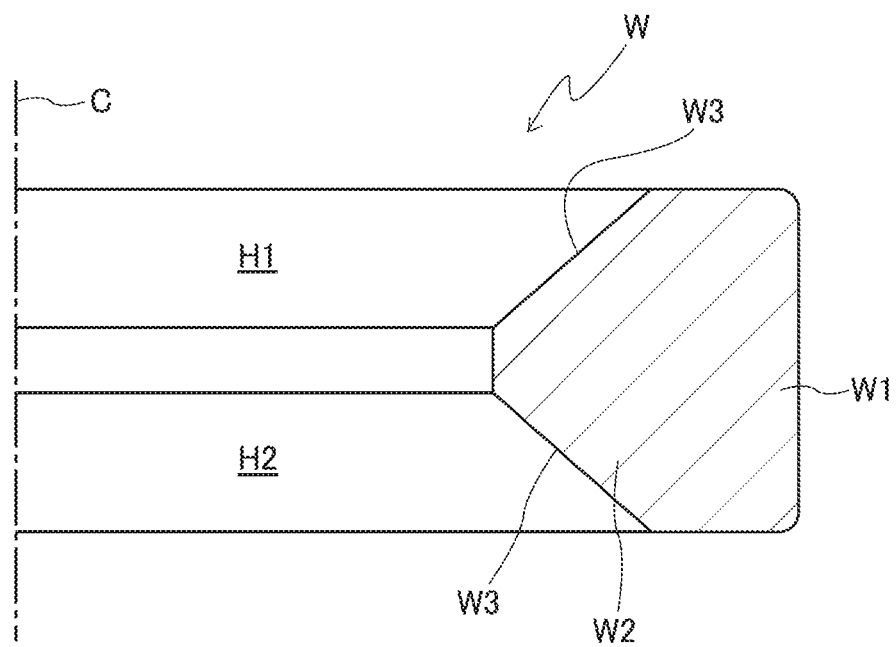
FIG. 1 is a partial cross-sectional view of a workpiece to be heated of the present invention.

The embodiment of the present invention will hereinafter be explained in detail by referring to the drawings.

This embodiment will be explained by referring to an example where a large ring-shaped object to be heated is heated and cooled as heat treatment.

In this case, heat treatment is defined as treatment whereby a workpiece W is subjected to heating and cooling in combination under various conditions, thereby changing the structure, hence the properties, of the workpiece such as hardness and toughness. Heat First Embodiment

[Workpiece]

A workpiece, namely an object to be heated in the present invention, will be explained first.

The workpiece to be heated is a heat-treatable material such as steel, and either the one whose surface only can be heated or the one whose inner part also can be heated may be used as the workpiece. On a part of the surface of the workpiece, areas to be heated are established, extending in one direction in roughly a constant shape. In particular, application to a workpiece wherein the entire length of the areas to be heated is longer than their width, namely a distance between the both edges of the areas to be heated, is favorable. In the case of a workpiece having edges, one direction is defined as a direction along a straight line, undulating line, curved line, etc. extending between the both edges. In the case of a ring-shaped workpiece, it is the direction along the shape of the ring.

The shape of the workpiece is arbitrarily selectable, but the present invention is favorably applicable to a workpiece wherein the deformation amount, that appears due to thermal expansion on one edge in the width direction of the areas to be heated when the areas to be heated are induction-heated, is different from that on the other. For example, if the shape of one edge and that of the other edge of the areas to be heated are significantly different from each other viewed as a cross section perpendicular to the areas to be heated, the deformation amount that appears on both edges of the areas to be heated due to thermal expansion caused by induction heating becomes different.

As shown in FIG. 1, workpiece W in this embodiment is in a shape of a ring, and on its surface, areas to be heated H1, H2 are provided locally at two or more positions. Each of the areas to be heated H1, H2 is provided in a shape of a ring along the ring shape of the workpiece W.

The workpiece W is in a shape of a ring, and in its cross-sectional view, has a base W1 and a protrusion W2 protruding inward from the base W1. The protrusion W2 has inclined surfaces W3 inclining inward in reverse directions. On one of the inclined surfaces W3, a first area to be heated H1 is provided, and on the other inclined surface W3, a second area to be heated H2 is provided endlessly along the shape of the ring respectively. The first and the second areas to be heated H1, H2 may be areas whose surface only is to be heated, or those whose internal regions also can be heated, but in this embodiment, the surface only is the area to be heated.

This workpiece W is an example of an outer ring constituting a large ring-shaped rotating ring or an outer ring constituting a large bearing etc. having a diameter of 1 m or larger, 3 m or larger in this case.

In this workpiece W, the first and the second areas to be heated H1, H2 extend almost in parallel to each other in roughly a constant shape. The first area to be heated H1 and the second area to be heated H2 are plane-symmetrical: by inverting one edge and the other edge of the workpiece W, the first area to be heated H1 and the second area to be heated H2 are disposed in the same positions.

The workpiece is in a shape allowing the of deformation amount that appears due to thermal expansion on one edge in the width direction of the areas to be heated H1, H2 to differ from that on the other when one or both of the areas to be heated H1, H2 is/are subjected to induction heating. The reason for this is as follows: the deformation amount due to thermal expansion that appears when both edges of the areas to be heated H1, H2 are subjected to induction heating differ because the shape of one edge and that of the other edge of the areas to be heated H1, H2 are significantly different from each other in cross-sectional view perpendicular to the areas to be heated H1, H2.

[Heat Treatment Equipment]

Heat treatment equipment using an induction heating device in this embodiment will be explained below. In this embodiment, induction heating equipment having an induction heating device, a setting unit for setting induction heating conditions, and a switching unit is also referred to as an induction heating device to facilitate understanding.

Figure 2:
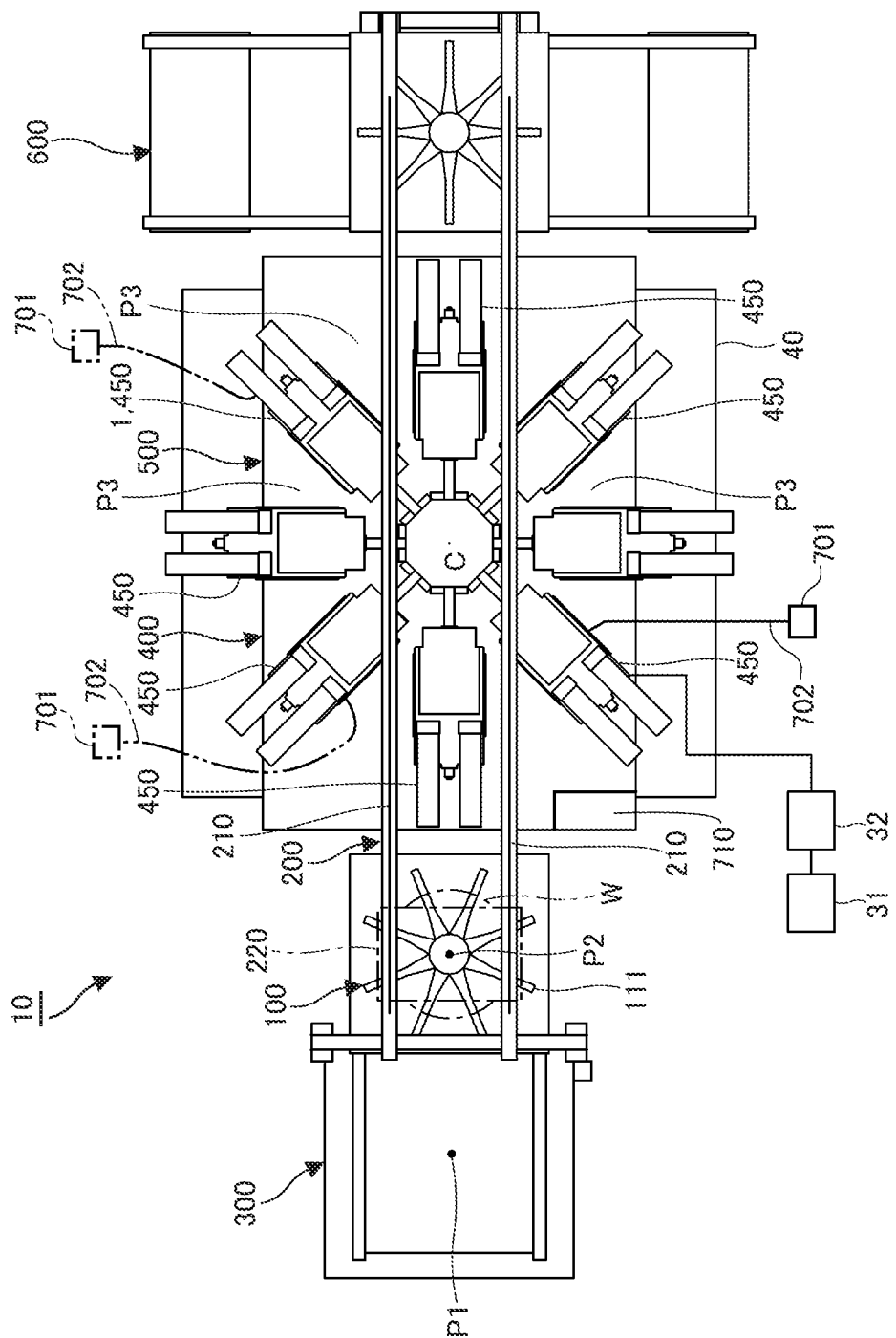
FIG. 2 is a plan view of heat treatment equipment according to the embodiment of the present invention.
Figure 3:
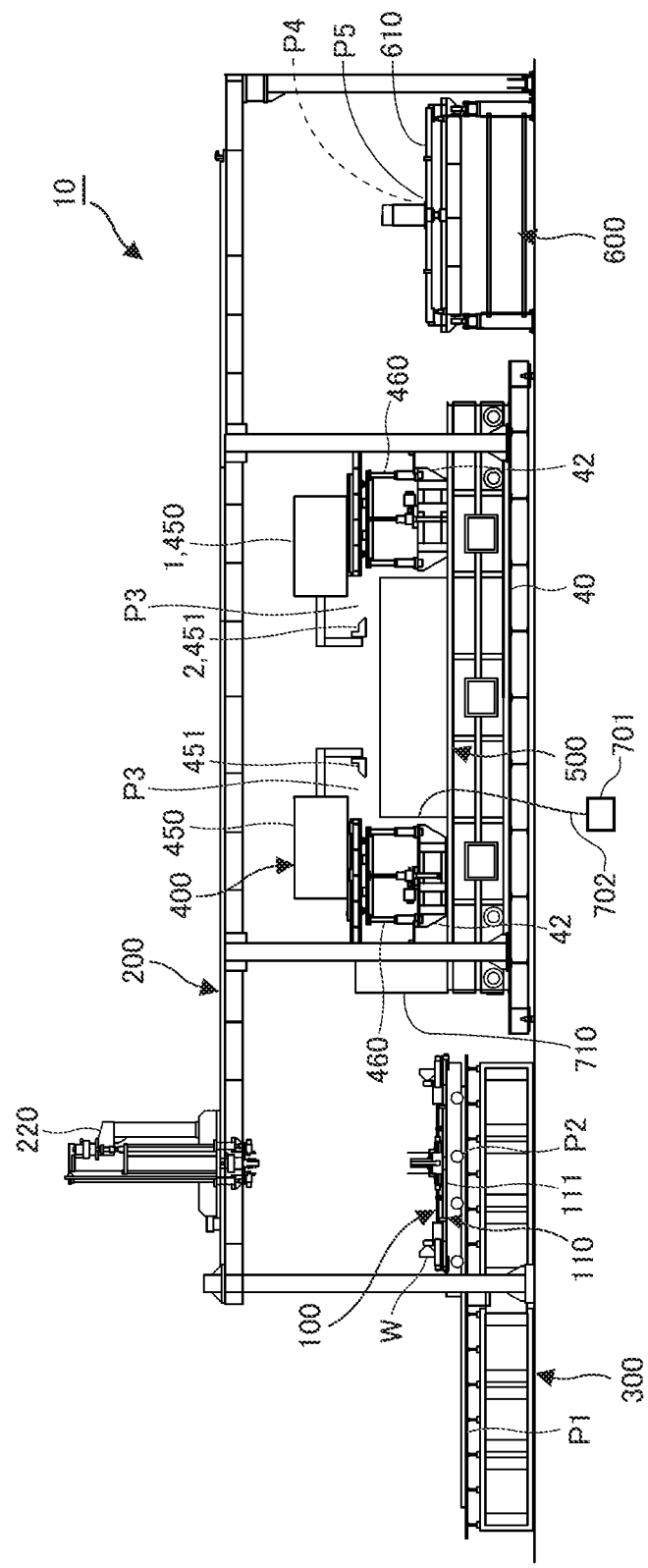
FIG. 3 is a side view of the heat treatment equipment according to the embodiment of the present invention, not showing a heating unit provided on the front side.
Figure 4:
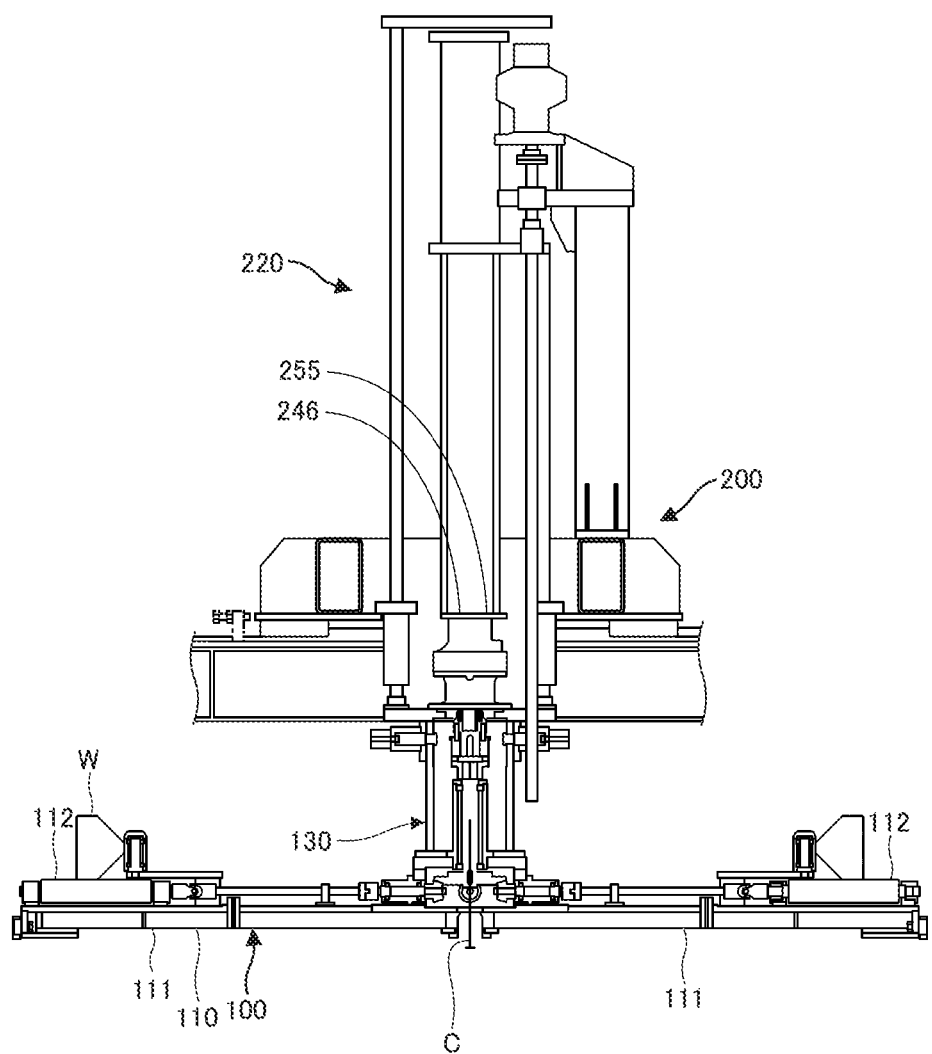
FIG. 4 is a side view of the heat treatment equipment according to the embodiment of the present invention, with a part of it shown in cross-sectional view so that a state where a jig of the heat treatment equipment is connected to a transfer loader is shown.

As shown in FIG. 2 to FIG. 4, heat treatment equipment 10 includes: a jig 100 for supporting the workpiece W; a bring in/out section 300 for bringing in/out the workpiece W; a transfer mechanism 200 for hoisting and transferring the jig 100; a heating section 400 for heating the workpiece W placed on the jig 100 while rotating it; a cooling section 500 installed at a place lower than the heating section 400; a parts replacement section 600 installed on the opposite side of the bring in/out section 300; and electrical facilities for driving each section.

As shown in FIG. 4, the jig 100 includes: a workpiece supporting member 110 on which a workpiece W is placed; and a central structure 130 installed at the center of the workpiece supporting member 110. The workpiece supporting member 110 is equipped with rotating rollers 112 arranged in a radial fashion on the side of the tip of a plurality of radial racks 111 extending in radial direction as relative transfer means. The rotating rollers 112 can be rotationally driven by a driving force input to the central structure 130. The workpiece W can be moved along the shape of a ring by rotating each of the rotating rollers 112.

As shown in FIG. 2 and FIG. 3, the bring in/out section 300 is structured to place the workpiece W on the workpiece supporting member 110 of the jig 100 at bring in/out position P1, transfer it to a suspending position P2, and place the jig 110 accurately at the suspending position P2.

As shown in FIG. 2 and FIG. 3, the transfer mechanism 200 has transfer rails 210 installed above each sections and a transfer loader unit 220 that travels along the transfer rails 210. As shown in FIG. 4, the transfer loader 220 can be connected to the central structure 130 of the jig 100, and is structured to suspend and transfer the jig 100 in connected state. The transfer loader 220 is provided with a rotation driving means 246. By connecting the transfer loader 220 to the central structure 130 of the jig 100, each of the rotating rollers 112 of the jig 100 is driven to rotate by the rotation driving means 246.

As shown in FIG. 2 and FIG. 3, the heating section 400 has a structure, to which the present invention is applied, wherein the workpiece W placed on the jig 100 is uniformly heated while being made to rotate in a state where the jig 100 is placed at a predetermined position. Details will be described later.

As shown in FIG. 3, the cooling section 500 is installed below the heating section 400, and supplies cooling liquid from the cooling jacket 520, thereby cooling the workpiece W while rotating it, in a state where the jig 100 is lowered.

As shown in FIG. 2 and FIG. 3, the parts replacement section 600 is used to replace the parts of each section by allowing parts replacement jig 620 to support and transfer the parts of the heating section 400 and the cooling section 500.

Figure 5:
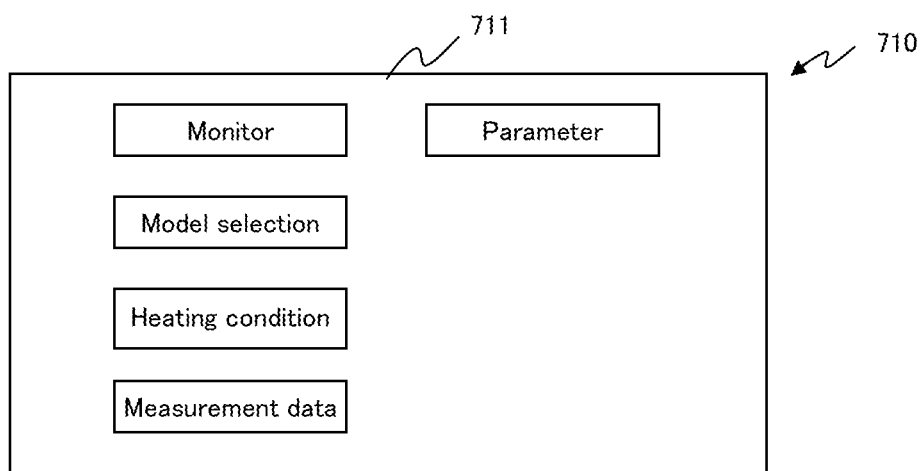
FIG. 5 is a chart showing the main menu screen of the operation unit of the heat treatment equipment according to the embodiment of the present invention.

The electrical facilities are structured to feed power to all the sections, and equipped with an operating unit 710 for controlling and operating each operating unit of all the sections. The operating unit 710 is equipped with a touch panel as shown in FIG. 5, on which information for each section can be entered and operation can be monitored. On the main menu of the operating unit 710 as shown in FIG. 5, monitor, model selection, heating condition selection, measurement data, and parameter screens of each section can be selected to enter or display desired items.

Figure 6:
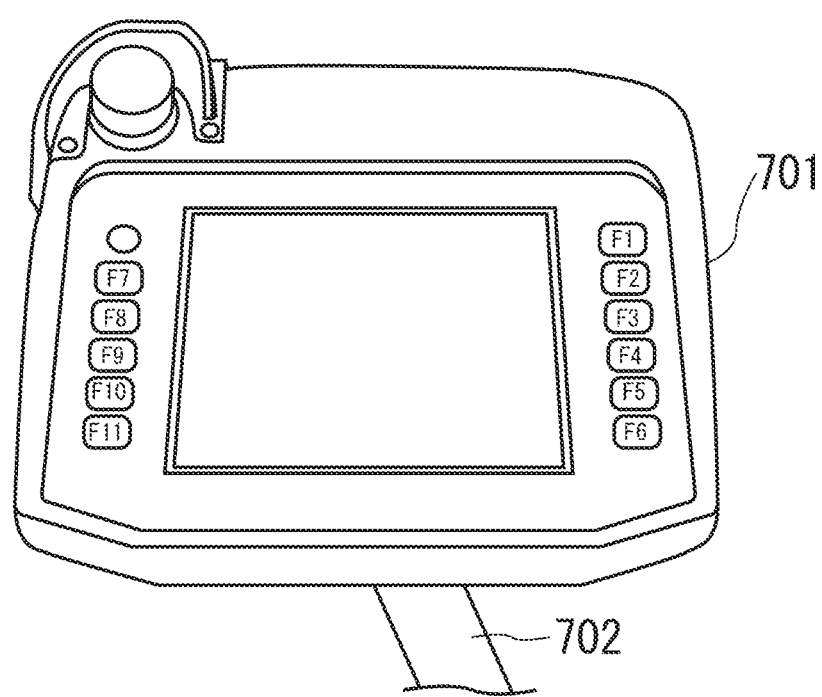
FIG. 6 is a view showing a mobile terminal of the operation unit of the heat treatment equipment according to the embodiment of the present invention.

This operating unit 710 includes a mobile terminal 701 as shown in FIG. 6 that can be carried around easily by an operator. With this mobile terminal 701, monitor, model selection, heating condition setting, measurement data, and parameter screens of each section can be selected to enter or display desired items so that the same operation as the operating unit 710 can be performed. This mobile terminal 701 is used by connecting terminals, which are provided at more than one position surrounding the heat treatment device 10, with use of wire i.e. a cable 702.

In this case, since connections are provided at more than one positions of the heat treatment equipment 10, the operator can perform various entry or other operations at various places of the heat treatment equipment 10 without traveling to the operation panel of the operating unit 710. Furthermore, since it is connected by wire using the cable 702, communication failures can be prevented and thus proper operations are ensured even with devices for performing heat treatment using high-frequency waves.

[Entire Configuration of the Heating Section]

Figure 7:
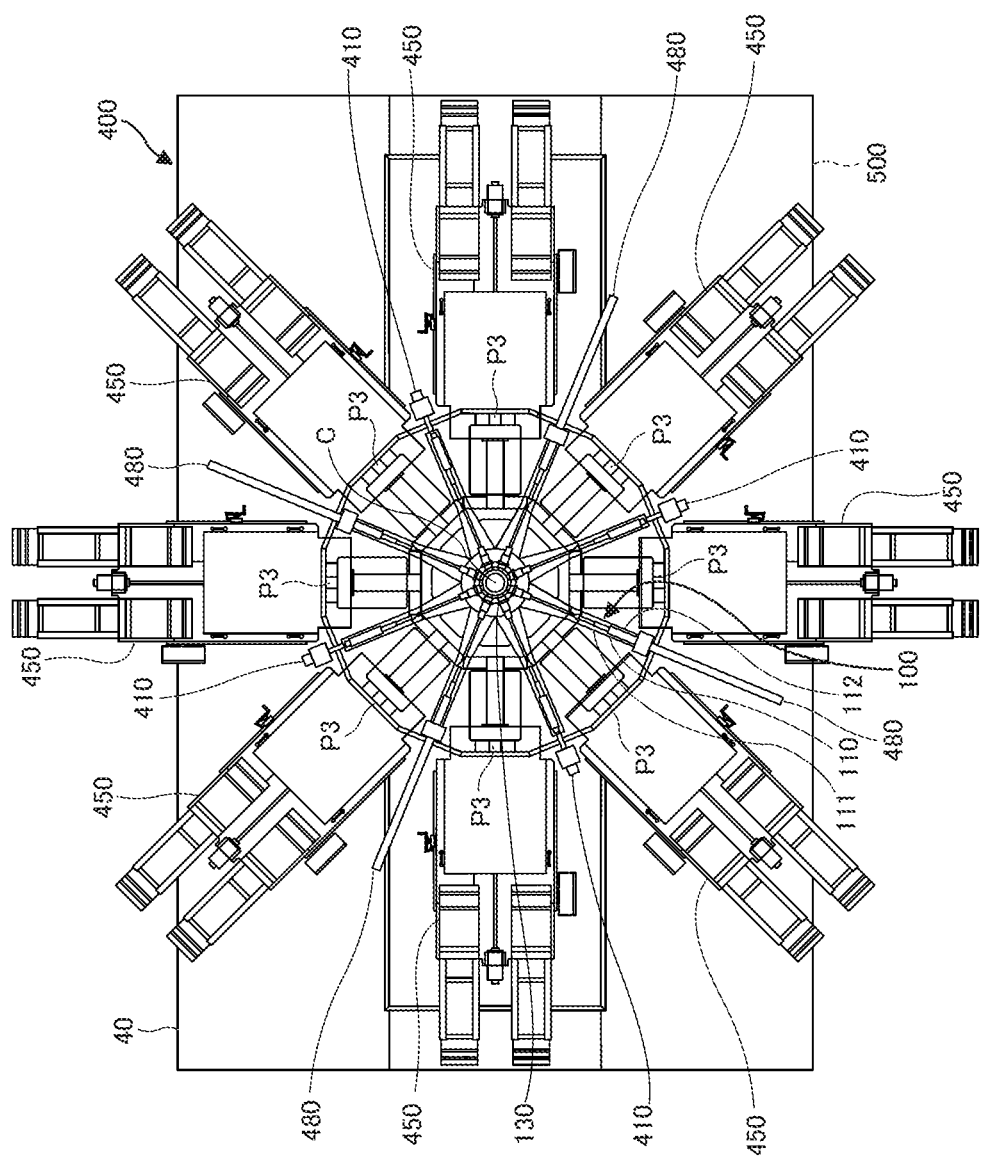
FIG. 7 is a schematic plan view showing a heating section of the heat treatment equipment according to the embodiment of the present invention.

As shown in FIG. 7, the heating section 400 includes: jig supporting mechanisms 410 for supporting the radial racks 111 of the jig 100 from under and controlling their transfer in the circumferential direction; and a plurality of heating units 450 for heating the workpiece W placed on the jig 100. The plurality of jig supporting mechanisms 410 and heating units 450 are provided circumferentially around the center of rotation C of the workpiece W, namely the center of the jig 100. In this case, workpiece W heating positions P3 are provided between the radial racks 111 of the jig 100 placed adjacent to each other, and each heating unit 450 is disposed so as to correspond to the heating position P3.

[Heating Unit]

Figure 8:
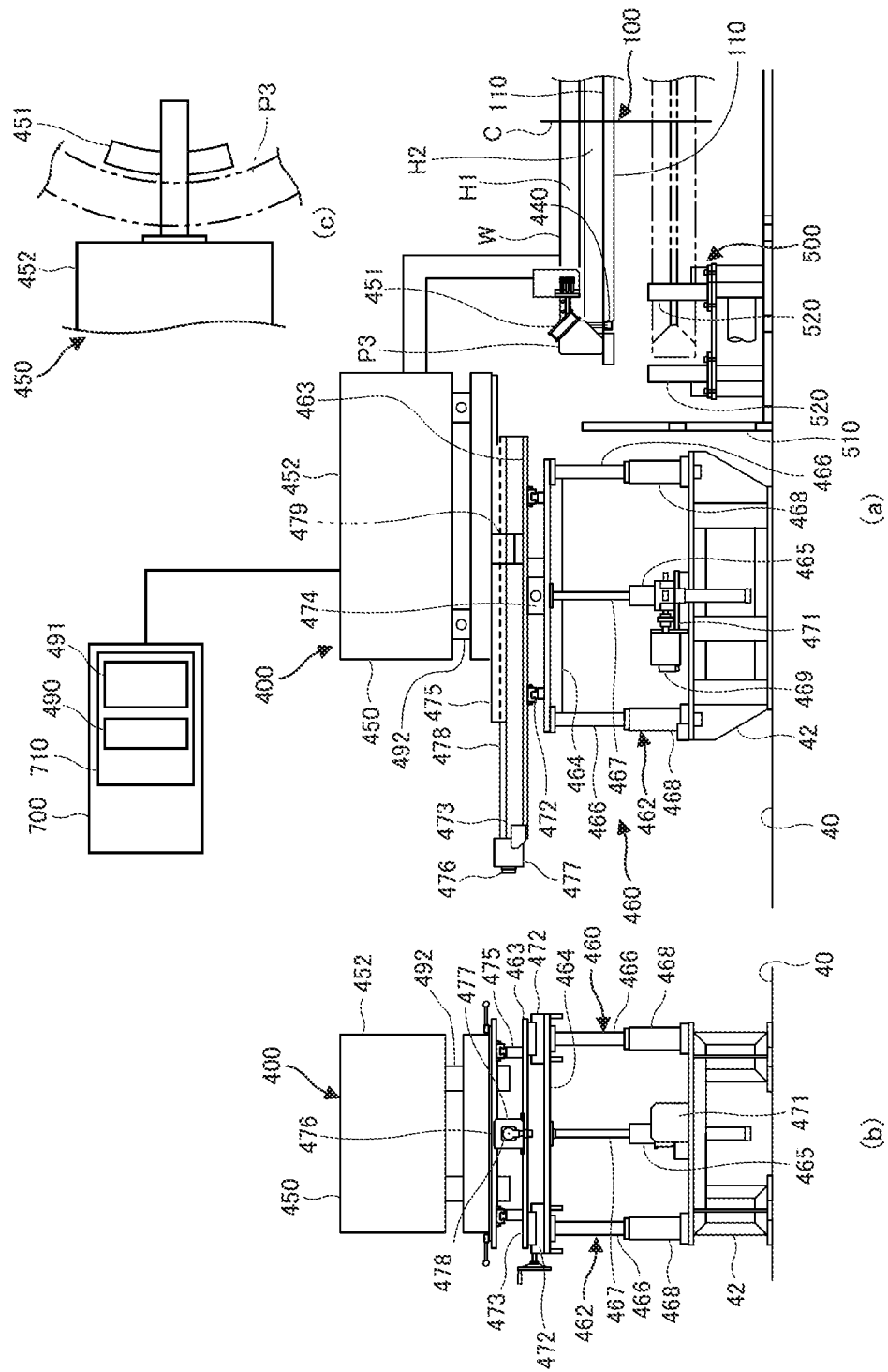
FIG. 8 (a) is a side view of a heating unit and a displacing means of the heating section according to the embodiment, (b) is their rear view, and (c) is their partial plan view.

As shown in FIG. 7 and FIG. 8, each heating unit 450 has a position detecting means 480 for detecting surface positions on the workpiece W, and a heating coil 451 placed facing the areas to be heated H1, H2 of the workpiece W placed on the jig 100 at each heating position P3. Furthermore, each heating unit 450 includes: power feeding equipment 700, which is a part of the electrical facilities, for controlling each part of the heating unit 450 and feeding high-frequency power to the heating coil 451; a supporting box 452 for connecting and supporting the heating coil 451; a displacing means 460; a posture control unit 490; a power adjusting means 491; and an auxiliary cooling unit 440. The displacing means 460 displaces the relative position, and changes the relative angle, of the heating coil 451 with respect to the workpiece W by displacing and changing the orientation of the supporting box 452 based on the result of detection of the position detecting means 480. The posture control unit 490 controls the operation of the displacing means 460 to adjust the relative position and relative angle of the workpiece W and the heating coil 451. The power adjusting means 491, which is a part of the power feeding equipment 700, adjusts the high-frequency power fed to the heating coils 451. The auxiliary cooling unit 440 sprays cooling liquid, while one of the areas to be heated H1, H2 is being heated, to the other portion, the other area to be heated H1, H2, in particular, to cool the portion.

[Position Detecting Means]

The position detecting means 480 detect the position of the surface of the workpiece during heating. As shown in FIG. 7, they are disposed upstream of each heating position P3. In this embodiment, they are disposed between every two heating positions P3 at positions corresponding to the radial rack 111 of the jig 100 placed upstream.

Figure 9:
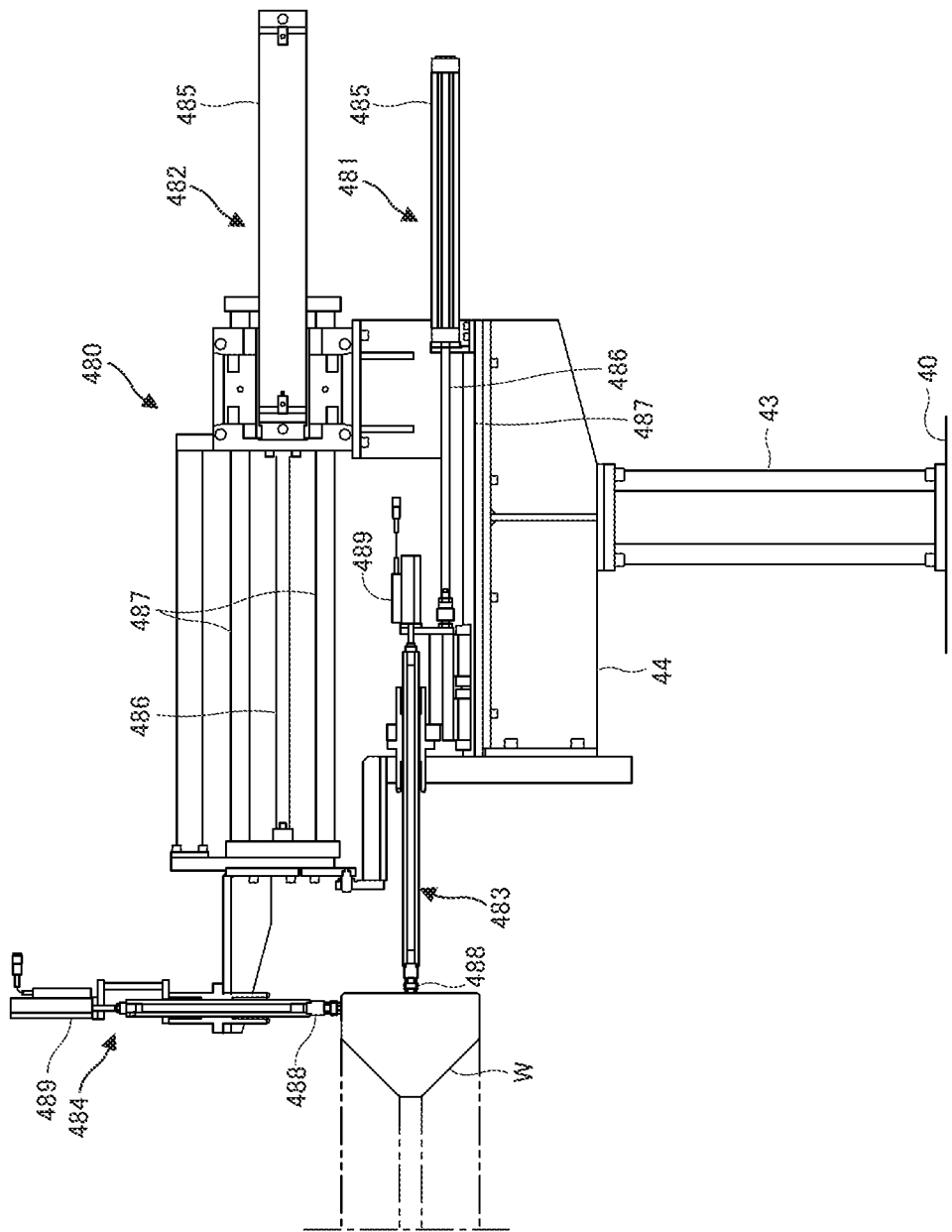
FIG. 9 is a partial side view of a position detecting unit of the heating section according to the embodiment of the present invention.

Specifically, as shown in FIG. 9, each position detecting means 480 is mounted to a position detection rack 44 installed on the position detection column 43 of the heating/cooling rack 40. Each position detecting means 480 has a radial position detector 483 mounted to the position detection column 43 via a first expanding/contracting mechanism 481, and an axial position detector 484 mounted via a second expanding/contracting mechanism 482. The radial position detector 483 and the axial position detector 484 are disposed perpendicular to each other.

A first and a second expanding/contracting mechanisms 481, 482 include; a driving means for expansion/contraction 485 such as an air cylinder; and a plurality of guide rods 487 disposed in parallel with the rods 486 of the driving means for expansion/contraction 485. Each expanding/contracting mechanism 481, 482 is prevented from falling along the detecting direction of each position detector 483, 484 by means of the rod 486 and the guide rod 487.

The radial position detector 483 and the axial position detector 484 are respectively equipped with a rotatable and heat-resistant contactor 488 coining in contact with the surface of the workpiece W, and a variation detector 489 for detecting the amount of expansion/contraction of the contactor 488 while pressing down the contactor 488 against the workpiece W. As each variation detector 489, an air cylinder with a linear sensor can be used, for example.

Since the temperature of the areas to be heated H1, H2 increases during heating, the contactor 488 is made to come in contact with positions other than the areas to be heated H1, H2, which are being heated, for detection. In the case of the radial position detector 483, the contactor 488 is made to come in contact with the intermediate position on the outer peripheral surface of the workpiece W, and the position on the surface of the workpiece W along the radial direction from the rotation center C of the workpiece W is detected. In the case of the axial position detector 484, the contactor is made to come in contact with an outside position of the top surface of the workpiece W placed on the jig 100, and the position of the surface of the workpiece along the axis line forming the rotation center C of the workpiece W is detected.

While heating is performed, the contactor 488 of the radial position detector 483 and that of the axial position detector 484 of each position detecting means 480 are made to come in contact with the workpiece W. When the workpiece W is rotated, the contactors 488 contacting the surface expand or contract while rotating, depending on the displacement of the surface of the workpiece W. For example, by measuring the amount of expansion/contraction of the contactors 488 with a given position in the circumferential direction of the workpiece W used as a reference position, the amount of displacement from the reference position is detected at each position in the circumferential direction of the workpiece W. Since the workpiece W is in a shape of a ring, one turn allows the workpiece W to return to the original position.

In this way, by detecting the amount of displacement of the contactors 488 by the variation detector 489, the displacement in vertical and horizontal directions on the surface of the workpiece W is detected, and signals indicating measurement positions are output.

[Heating Coil]

The heating coils 451 are formed in a size facing a portion of the entire length along one direction of the areas to be heated H1, H2, and placed facing a portion of the workpiece W disposed at the heating position P3, of its entire circumference. The heating coils 451 of each heating unit 450 are arranged over the entire length of the areas to be heated H1, H2 uniformly at given intervals from each other.

The shape of the heating coils 451 is selectable arbitrarily from the shapes corresponding to the arc shape of the heating region of the workpiece W in planer view and having vertical cross-sectional shape corresponding to the vertical cross-sectional shape of the workpiece W. In this embodiment, a plurality of heating coils 451, favorably all the heating coils 451, are in the same shape.

For example, the heating coils 451 may be in a shape where a material in a shape of a pipe, rod, or plate having approximately uniform cross section is made to snake up and down in a given area in the circumferential direction of the workpiece W. Specifically, as shown in FIG. 20 (a), the heating coils may be in a zigzag shape formed by connecting square pipes so that the hollow center continues over the entire length, providing an inlet 451b and an outlet 451c for cooling liquid at both ends, and allowing the regions facing the workpiece W to bend at a plurality of bending portions 451d. As shown in FIG. 20 (b), they may be in a zigzag shape formed by allowing a pipy coil material having a round cross section to curve at a plurality of curving portions 451e.

As heating coils 451 used for a case where the peripheral length of the areas to be heated H1, H2 is different between the inner and outer sides, those as shown in FIG. 20 (c) may be used. The portion of this heating coil 451 facing the workpiece W may be made of a square pipe. The heating coils may be formed by bending the square pipe at a plurality of bending portions 451*f* in the inner and the outer sides and at the bending portions 451*g* provided between the bending portions 451*f* to form it in a zigzag shape. With this heating coil 451, the length in the circumferential direction in regions far away from the rotation center C may be made to be longer than the length in the circumferential direction in the regions closer to the rotation center W.

With such heating coils 451, to heat each area to be heated H1, H2 more uniformly, it is desirable that the gap between the heating coils 451 and the areas to be heated H1, H2 be uniform as far as possible across the entire length.

To achieve this, it is desirable that the shape of the areas to be heated H1, H2 and the shape of the surface of the heating coils 451 facing the areas to be heated H1, H2 be identical in a range as wide as possible. It is also desirable that the area of the heating coils 451 facing the areas to be heated H1, H2 be uniform as far as possible along the width direction of the areas to be heated H1, H2. Furthermore, it is preferable that the angle formed by the surface of the heating coils 451 facing the areas to be heated H1, H2 and the areas to be heated H1, H2 in the cross section perpendicular to the areas to be heated H1, H2 is as small as possible, favorably 0 degrees.

The width of the heating coils 451 in the direction perpendicular to the areas to be heated H1, H2 is preferably the same as the width of the areas to be heated H1, H2. If the width of the heating coils 451 is narrow, by displacing the disposition of the plurality of heating coils 451 in the width direction, the areas to be heated H1, H2 can be heated uniformly across the entire width.

In this embodiment, the surface of the heating coils 451 facing the areas to be heated H1, H2 has a shape corresponding to the areas to be heated H1, H2, and their width perpendicular to the areas to be heated H1, H2 is slightly narrower than the width of the areas to be heated H1, H2.

[Power Feeding Equipment]

Before the power feeding equipment 700 is explained, induction heating device circuits applicable to various workpieces will be explained.

Figure 11:
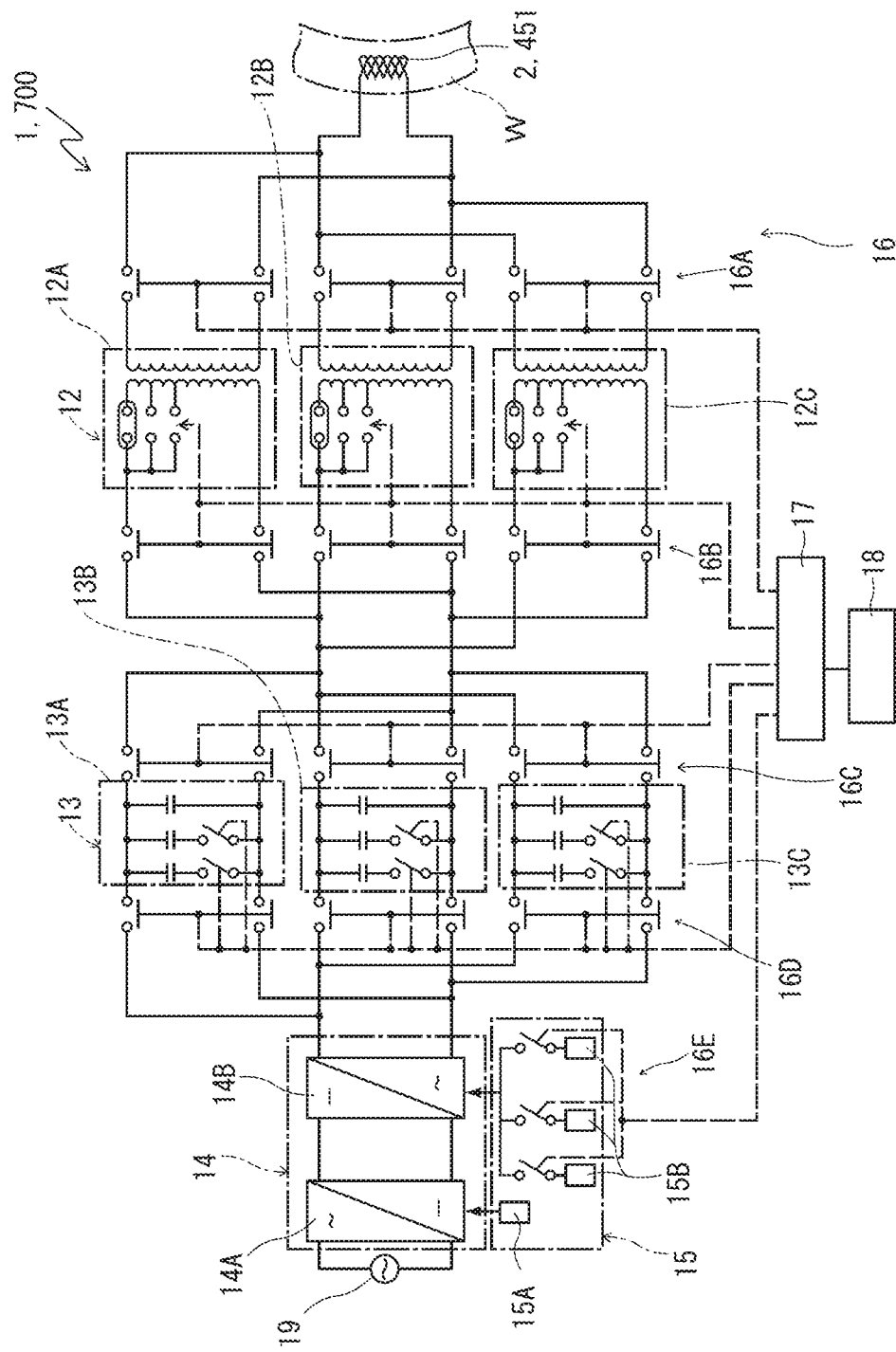
FIG. 11 is a circuit diagram of power feeding equipment of the heat treatment equipment according to the embodiment of the present invention.

FIG. 11 is a circuit diagram of an induction heating device 1 according to the embodiment of the present invention. As shown in FIG. 11, the induction heating device 1 according to the embodiment of the present invention includes: a plurality of transformers 12 connected to heating coils 2 in parallel; a plurality of matching units 13 connected to any one of the plurality of transformers 12; an inverter 14 connected to any one of the plurality of matching units 13; an inverter control unit 15 for controlling the inverter 14; a group of switches 16 for connecting the inverter 14 and the matching units 13, the matching units 13 and the transformers 12, and transformers 12 and the heating coils 2 by switching; a switching control unit 17; and a setting unit 18.

The inverter 14 is connected to a commercial power supply 19, and includes: a rectifier unit 14A for converting commercial voltage into DC voltage; and an inverter unit 14B for converting the DC voltage from the rectifier unit 14A into an AC voltage having a specified frequency.

The inverter control unit 15 includes: a rectification control unit 15A for controlling the rectifier unit 14A and a plurality of inversion control units 15B for controlling the inverter unit 14B. Each inversion control unit 15B separately controls the inverter unit 14B to obtain voltages having different frequencies and output them from the inverter unit 14B.

The plurality of matching units 13 include matching units 13A, 13B, and 13C having different capacities. The matching units 13A, 13B, and 13C may include an inductance, in addition to a capacitor.

The plurality of transformers 12 are configured to include: a primary winding connected to the matching units 13 via switches 16B, and 16C; and a secondary winding connected to the heating coil 2 via switch 16A. Each transformer 12 has different primary winding/secondary winding ratios.

The group of switches 16 include: three switches 16A, for example, for connecting the heating coil 2 and any one of the plurality of transformers 12; three pairs of switches 16B and 16C for connecting any one of the plurality of transformers 12 and any one of the plurality of matching units 13; three switches 16D, for example, for connecting any one of the plurality of matching units 13 and the inverter 14; and three switches 16E, for example, for connecting any one of the plurality of inversion control units 15B and the inverter unit 14B.

The setting unit 18 divides induction heating time into divisions, and by the division, sets frequency setting information of the voltage output from the inverter 14 as well as the information for selecting matching circuits, namely combinations of the plurality of matching units 13 and the plurality of transformers 12, as induction heating conditions.

According to the induction heating conditions set by the setting unit 18, the switching control unit 17 selects any one of the plurality of inversion control units 15B, controls the inverter unit 14B, and outputs a voltage having a specified frequency for each division of the induction heating time. At the same time, the switching control unit 17 connects a matching unit 13 to the inverter 14 via the group of switches 16, namely switches 16A, 16B, 16C, and 16D, connects this matching unit 13 to a transformer 12, and connects this transformer 12 to the heating coil 2.

As a monitor displaying output status from the inverter 14, the setting unit 18 is provided with a touch panel for an input/output operation screen for setting various induction heating conditions. FIG. 12 is a drawing of a step data setting screen displayed in the setting unit 18 as shown in FIG. 11. On the operation unit 18, a step data setting screen, for example, as shown in FIG. 12 is displayed. On this step data setting screen, a step time, a workpiece rotation rate, and a power and a voltage as output conditions from the inverter 14 can be set by the step. On this step data setting screen, the frequency of the power output from the inverter 14 may also be set.

To set a state where power is not fed from any one of the inverters 14 in a specific step, the output power and the voltage from the inverter 14 can be set at zero or low values, and the switching between matching circuits, namely combinations of transformers 12 and matching units 13, can be selected. FIG. 13 is a drawing showing the screen for setting circuit setting conditions displayed in the setting unit 18 shown in FIG. 11, if "matching circuit switching" is selected on the screen shown in FIG. 12, a circuit setting condition screen as shown in FIG. 13 appears, and on that screen the type of transformers 12 and that of matching units 13 can be selected. For example, as shown in FIG. 13, "MTr voltage selection" options for selecting number of turns to select transformers, "capacitor capacity" options for selecting matching units, and inversion control unit options are displayed as a circuit setting condition select screen for each of the number the heating coils 2. And, these options can be selected to make the setting, On the screens as shown in FIG. 12 and FIG. 13, the frequency of AC current output from the inverter 14 is set by selecting an inversion control unit under the circuit setting conditions as shown in FIG. 13. It is also possible to provide a new column on the rightmost side on the step data setting screen as shown in FIG. 12, and to set the frequency to be output at each step. To switch matching circuits and frequencies, it is not always necessary to set the output from the inverter 14 to zero. It is only necessary to decrease the output level from the inverter 14, for example.

According to the induction heating device 1 of the embodiment of the present invention, by adopting such a circuit configuration, since the induction heating time can be divided into divisions by the setting unit 18 and the inversion control unit 15B can be selected, then the voltages having different frequencies can be output before and after the selection. In addition, by selecting a combination of switches 16A to 16D, combinations of the matching units 13 and the transformers 12 can be switched. Consequently, by varying the output frequency of the inverter 14 and changing the combinations of the matching units 13 and the transformers 12 in the process of increasing the temperature of the workpiece W by the use of induction heating, the power output from the inverter 14 can be used for induction heating of the workpiece W even if the magnetic permeability of the workpiece W changes. Note that it is not always necessary to change the selection of inversion control units 15B when heating the same workpiece W.

Figure 14:
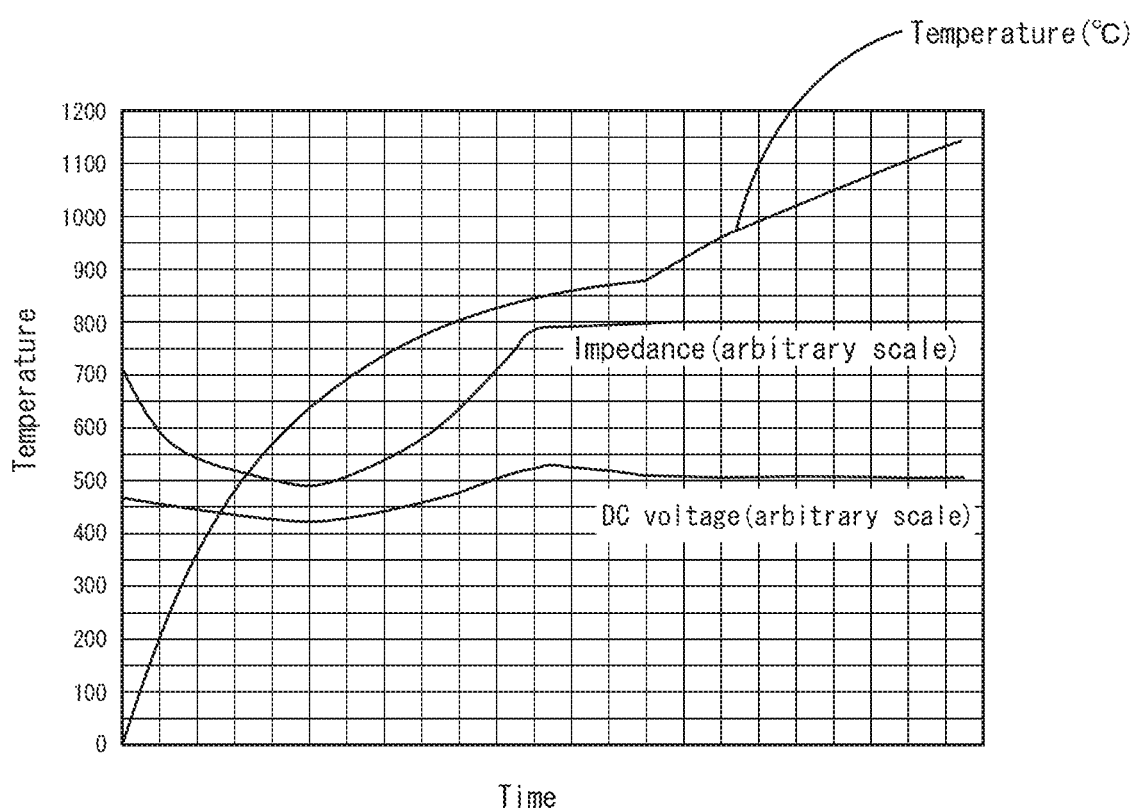
FIG. 14 is a chart schematically showing the output characteristics of the inverter in a circuit configuration different from FIG. 11, obtained when induction heating was performed in relatively short time with the frequency of the output from the inverter unchanged during heating.

The case where the temperature of a workpiece is increased to a desired level by induction heating performed for relatively long time using the induction heating device 1 as shown in FIG. 11 will hereafter be explained. FIG. 14 is an explanatory drawing exhibiting that induction heating can be performed for relatively long time by the induction heating method according to the embodiment of the present invention. The output frequency from the inverter 14 is unchanged during heating unlike the device as shown in FIG. 11. Namely, it is a chart showing the temperature of the workpiece, output impedance of the inverter 14, and the output of the inverter 14 assessed by DC voltage obtained when induction heating was performed in relatively short time. FIG. 14 shows that the output impedance from the inverter 14 decreases with time to the minimum value, and then the output impedance starts to remain constant when the temperature of the workpiece W increases to approximately 700° C. to 800° C. When the output impedance ceases to increase, the output voltage from the inverter 14 hits the peak, and then decreases. Therefore, the output from the inverter 14 is not subsequently applied to the workpiece.

However, in the embodiment of the present invention, the output frequency of the impedance 14 can be changed depending on the heating temperature with the elapse of heating time, and this output frequency value, the matching unit, and the transformer can be selected. It is therefore possible to feed induction current to the workpiece W, thus increasing the temperature of the workpiece to a desired level, even if the material of the workpiece W, in particular the physical properties such as a magnetic permeability should change during heating.

A typical variation of the induction heating device 1 as shown in FIG. 11 will hereafter be explained. In FIG. 11, the inverter 14 may include an impedance measuring unit for measuring the output impedance. The inverter measuring unit measures the current and the voltage output from the inverter unit 14B and their phase difference. The measurement results are output from the inverter 14 to the switching control unit 17. Now assume that on the step data setting screen of the setting unit 18 shown in FIG. 12, "with" is selected for "switching of matching circuits" of step 4, for example. The switching control unit 17 is monitoring the measurement results input from the inverter measurement unit at all times. If the impedance exceeds the current allowable impedance range, and matching circuits are to be switched at the next step, the next step is forcibly entered even if the period of time specified at the current step has not elapsed. In other words, when the measurement result input from the impedance measuring unit is found to exceed the allowable impedance range, the switching control unit 17 judges whether switching of matching circuits should be made or not by referring to the conditions associated with the next division, of the induction heating conditions having been set by the setting unit 18. When the matching circuits are to be switched, the switching control unit selects the inversion control unit 15B that is to be set at the next step forcibly, the switching control unit 17 changes the frequency of the voltage output from the inverter 14, and switches the group of switches 16. Thus the frequency of the voltage output from the inverter 14 is changed and at the same time matching circuits are switched to ensure impedance matching.

An example where a heating unit 450, namely the induction heating device 1 in this first embodiment, is configured by applying the design concept of the induction heating device 1 as shown in FIG. 11 will be explained.

In this case, the induction heating device 1 as shown in FIG. 11 is applied to the power feeding equipment 700 of the heating unit 450. As shown in FIG. 11, each heating unit 450 incudes: a heating coil 451; a plurality of transformers 12; a plurality of matching units 13; an inverter 14 including a rectifier unit 14A and an inverter unit 14B; an inverter control unit 15 including a rectification control unit 15A for controlling the rectifier unit 14A and a plurality of inversion control units 15B for controlling the inverter unit 14B, thus obtaining respective voltages having specified frequencies; and a group of switches 16.

As shown in FIG. 2, the heat treatment equipment 10 includes: a setting unit 31 for collectively setting induction heating conditions for each heating unit 450; and a switching control unit 32 for switching and controlling the group of switches 16 of each heating unit 450 by that setting unit 31.

The setting unit 31 divides induction heating time into divisions, and by the division, and by heating unit 450, sets frequency setting information of the voltage output from the inverter 14 as well as the information for selecting matching circuits, namely combinations of the plurality of matching units 13 and the plurality of transformers 12, as induction heating conditions.

Consequently, the switching control unit 32 selects any one of the plurality of inversion control units 15B and controls the inverter unit 14B, thereby outputting a voltage having a specified frequency, for each of the heating unit 450 and by the division, following the induction heating conditions set by the setting unit 31. Furthermore, the switching control unit 32 connects a matching unit 13 to the inverter 14, connects the matching units 13 to a transformer 12, and connects the transformer 12 to the heating coil 451, by using the group of switches 16.

As a result, induction heating conditions can be set by setting unit 31 for each of the heating unit 450, the output state from the inverter 14 can be set, and a matching circuit can be selected by time unit from the start of induction heating. Consequently, receiving the input of an induction heating start signal, the switching control unit 32 controls the inverter 14 by the rectification control unit 15A and the selected inversion control unit 15B of the inverter control unit 15 for each of the heating unit 450 with the elapse of time from the start of induction heating, based on the induction heating conditions set in the setting unit 31. The voltage having a specified frequency is output from the inverter 14. Furthermore, by combination of selected matching unit 13 and transformer 12, impedance matching corresponding to that frequency is ensured. Consequently, even if the structure of the workpiece changes due to induction heating, and thus its properties such as the magnetic permeability change, switches of the group of switches 16 are switched by the switching control unit 32 in accordance with the circuit setting conditions set by the setting unit 31.

With the heat treatment equipment 10 as shown in FIG. 2 and FIG. 3, in particular, when performing induction heating of a large workpiece W, such as an outer ring constituting a large rotating ring or an outer ring constituting a large bearing having diameter of 1 m or larger, while allowing the workpiece W to travel, the entire induction heating time inevitably becomes long. In this case, a problem can be solved that impedance matching cannot be ensured as a result of change in structure of the workpiece W due to temperature increase, and thus application of power from the inverter 14 to the heating coil 451 becomes difficult. Even if the workpiece W is large, sufficient induction heating can be performed to increase the temperature to a desired level. Furthermore, with the heat treatment equipment 10 shown in FIG. 2 and FIG. 3, frequency may be changed at different timing for each of the heating units 450 in accordance with the quenching conditions of the workpiece, or frequency may also be changed at the same timing for all the heating units 450.

The circuit of such induction heating device 1 can be changed as required within the scope of the present invention. For example, a non-contact temperature sensor can be disposed near the workpiece W, and combinations of frequencies and matching circuits may be changed based on the induction heating conditions set with the detection value of that temperature sensor used as reference.

[Displacing Means]

The displacing means 460 is used to displace the relative position, and also change the relative angle, of the workpiece W and the heating coil 451.

As shown in FIG. 8, the displacing means 460 includes: a vertical displacing unit 462 for changing the position of the supporting box 452 vertically; a horizontal displacing unit 463 for changing the position of the supporting box 452 in the horizontal direction along the radial direction from the rotation center C of the workpiece W; and an angle changing unit 492 for adjusting the inclination of the supporting box 452.

The vertical displacing unit 462 includes: a displacement rack 42 fastened to the heating/cooling rack 40; a lower rack 464 displaced on the displacement rack 42; and a vertical driving mechanism 465 for moving the lower rack 464 up and down with respect to the lower rack 464.

The vertical driving mechanism 465 includes: a displacement guide rods 466 fastened to the lower rack 464 and disposed in vertical direction; vertical displacement screw shaft 467; displacement bearings 468 fastened to the displacement rack 42 and supporting the displacement guide rods 466 in vertically movable state; a vertical driving motor 469 such as a servo motor fastened to the displacement rack 42; and a connecting body 471 for moving the vertical displacement screw shaft 467 up and down by the rotation of the vertical driving motor 469.

The horizontal displacing unit 463 includes: first displacement rails 472 installed on the lower rack 464 in a direction approximately perpendicular to the radial direction of the workpiece W; an upper rack 473 movable on the first displacement rails 472; a first displacement driving mechanism 474 for moving the upper rack 473 along the first displacement rails 472; second displacement rails 475 installed on the upper rack 473 along the radial direction of the workpiece W; and a second displacement driving mechanism 476 for moving the supporting box 452, which is supported in a state movable on the second displacement rails 475, along the second displacement rails 475.

The first and the second displacement driving mechanisms 474, 476 respectively include; a displacement driving motor 477 such as servo motor; rotationally driven horizontal displacement screw shaft 478 disposed along the first or the second displacement rails 41475 and connected to the displacement driving motor 477; and a displacement protrusion 479 installed on the upper rack 473 or the supporting box 452 and screwed onto the horizontal displacement screw shaft 478. The first displacement driving mechanism 474 need not be installed, provided that the heating coil 451 can be positioned in advance along the direction approximately perpendicular to the radial direction of the workpiece W.

The angle changing unit 492 is installed in the supporting 452, and by raising or lowering the top part of the supporting box 452 so that the height on the front side and that on the rear side become different with respect to the bottom part of the supporting box 452 supported by the first or the second displacement rails 41475, for example, the inclination of the supporting box 452 can be changed. Although the detailed drawing is not shown, male screws rotated by a step motor are provided at the top and the bottom sides, and female screws screwed into the male screws are provided on the other, to raise or lower each position of the supporting box 452.

By allowing the height of the supporting box 452 to become different between the side of the workpiece W and the opposite side using the angle changing unit 492, the orientation of the heating coils 451 can be changed around the shaft along one of the longitudinal directions of the areas to be heated H1, H2. In this case, the shaft along one of the longitudinal directions is a shaft parallel to the workpiece W when the workpiece W is in a linear shape, and it is a shaft parallel to the tangential line of the shape of the ring, when the workpiece W is in a shape of a ring.

[Posture Control Unit]

The displacing means 460 is equipped with a posture control unit 490 for adjusting the relative position and relative angle of the workpiece W and the heating coils 451 by controlling the operation of the displacing means 460 based on the result of detection of the position detecting means 480. As shown in FIG. 8, this posture control unit 490 is integrated into the operation unit 710 of electrical equipment, and configured to control each driving device of the displacing means 460.

With this posture control unit 490, by the signal showing the measurement position of the workpiece W measured by each position detector 483, 484, the timing when each portion on the surface of the workpiece W having passed each detection position passes each heating unit 450 in immediately downstream parts and its position can be obtained, based on the amount of displacement of the workpiece W and the rotation speed of the rotation driving motor 255. Consequently, by displacing the heating coils 451 by the displacing means 460 so as to correspond to the position of each portion that passes the heating position P3, it becomes possible to allow the position of the heating coils 451 to follow the workpiece W.

By the way, when areas to be heated H1, H2 of the workpiece as shown in this embodiment are subjected to induction heating using heating coils 451 facing the areas to be heated H1, H2, with a specified gap maintained, the deformation amount on one edge of the areas to be heated H1, H2 and that on the other differ, resulting in non-uniform deformation of the workpiece W.

Figure 15:
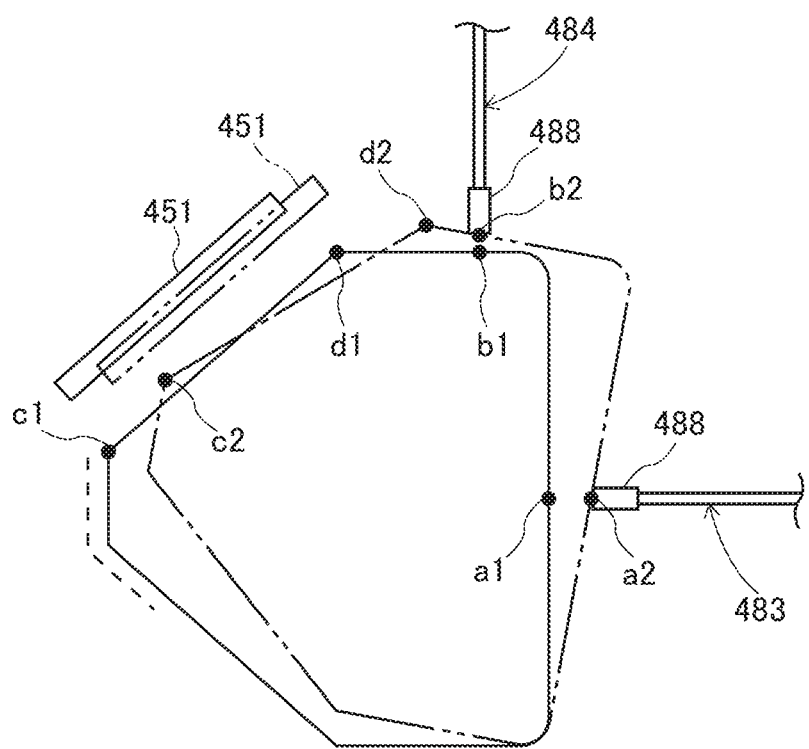
FIG. 15 is a schematic cross-sectional view for describing non-uniform deformation of the workpiece, exaggeratingly showing the deformation.

While a workpiece W at normal temperature as shown by the solid line in FIG. 15 is being rotated, the areas to be heated H1, H2, namely the area between c1 and d1 on the internal peripheral surface of the workpiece W, is heated using the heating coils 451 and the bottom side of the inner peripheral surface shown by the broken line in the figure is cooled using a cooling liquid. Consequently, with the temperature increase of the areas to be heated H1, H2, non-uniform thermal expansion of the workpiece W occurs as shown in the virtual line in the figure, the deformation amount on one edge of the areas to be heated H1, H2 being different from that on the other. As a result, the areas to be heated H1, H2 become the area between c2 and d2. The deformation is shown exaggerated in the figure to facilitate understanding.

In this case, the contactor 488 of the radial position detector 483 measures a1 on the outer peripheral surface of the workpiece W when temperature is low, and as a result of deformation of the workpiece W, measures a2 after the temperature increase. Meanwhile, the contactor 488 of the axial position detector 484 measures b1 on the side peripheral surface of the workpiece W when temperature is low, and it measures b2 after the temperature increase. In other words, the measurement positions measured as a1, b1 with the position detecting means 480 are measured as a2, b2 after the temperature increase. In this case, heating is performed with the position of the heating coils 451 changed so as to correspond to the change in measurement positions between low and high temperatures.

However, since the workpiece W has deformed non-uniformly, the actual areas to be heated H1, H2 have changed from the position. between c1 and d1 to the position between c2 to d2. As apparent from the figure, the amount of change between c1 and c2 or between d1 and d2 is larger than the amount of change between a1 and a2 or between b1 and b2.

Consequently, if the workpiece W is heated using each heating coil 451 based only on the measurement positions measured by the position detecting means 480, the heating coil 451 is disposed at a position corresponding to the measurement position shown by the virtual line in the figure, and heating is performed at high temperatures in a state where the relative position of the heating coil 451 and the areas to be heated H1, H2 deviated non-uniformly. Furthermore, the upper edge of the areas to be heated H1, H2 on the side where distance from the heating coil 451 is longer, the volume of the workpiece W is larger, and the heat capacity is larger, than that of the lower edge. As a result, when the lower edge of the areas to be heated H1, H2, has been heated to a desired temperature, the upper edge may not be heated to a desired temperature, meaning that the areas to be heated H1, H2 cannot be heated uniformly.

To prevent such non-uniform heating of the areas to be heated H1, H2, the heat treatment equipment 10 in this embodiment is provided with a function to ensure uniform heating by adjusting the position and inclination of the heating coils 451 based on the heating conditions of the workpiece W and the heating state during the heating period.

Heating conditions in this case include the shape, size, and material of the workpiece W, shape and area of the heating coils 451 facing the workpiece, traveling speed of the workpiece W, the voltage, the current, and the frequency of the high-frequency power to be fed to the heating coils 451, cooling position of the workpiece W at the time of heating, and cooling liquid temperatures etc Heating state includes the surface temperature of the areas to be heated H1, H2, and elapsed heating time.

This posture control unit 490 adjusts the position and inclination of the heating coils 451 in appropriate heating state, preferably in predetermined heating state, after induction heating is started using the heating coils 451 under the predetermined heating conditions. As a result, it is made possible to heat the entire areas to be heated H1, H2 as uniformly as possible. The decrease in heating efficiency due to non-uniform width of the gap, etc. with respect to supplied power can be prevented.

Specifically, the following function is provided.

First, the results of detection by each position detecting means 480 at the time of heating, namely the measurement positions obtained by the detection result measured at positions other than the areas to be heated H1, H2, are corrected at least based on the shape of the workpiece, and the operation of the displacing means 460 is controlled so as to correspond to the corrected positions obtained by the correction.

It is preferable that the reference position is the one where the distance between the area of the heating coils 451 facing the areas to be heated H1, H2 and the surface of the areas to be heated H1, H2 becomes a specified value, provided that the gap between the heating coils 451 and the areas to be heated H1, H2 is uniform over the entire length of the heating coils 451.

If the gap between the heating coils 451 and the areas to be heated H1, H2 becomes non-uniform, a position can be selected where the distance between a given position on the face of the heating coils 451 facing the areas to be heated H1, H2 and a position on the areas to be heated H1, H2 corresponding to that position becomes a given value.

In this embodiment, the measurement positions detected by the radial position detector 483 and the axial position detector 484 of the position detecting means 480 are displacement from the reference position respectively. The corrected positions are corrected displacement obtained by correcting the measured displacement. This posture control unit 490 controls the operation of the displacing means 460 so as to correspond to the corrected displacement.

To correct measurement positions, the measurement position data can be corrected using a correction coefficient. For example, the corrected position can be found that a signal showing the measurement position is multiplied by a correction coefficient. This correction coefficient is at least a value corresponding to the shape of the workpiece, and by using a correction coefficient satisfying as many heating conditions as possible, the heating coils 451 can be arranged more accurately on the areas to be heated H1, H2.

Such a correction coefficient may be the one obtained by experience. Or, the deformation of the workpiece W at set heating state during heating may be calculated based on heating conditions, set heating state, etc., and a correction coefficient can be found based on the deformation amount of the region measured by the radial position detector 483 and the axial position detector 484 of the position detecting means 480 and the amount of displacement of the areas to be heated H1, H2 found by calculation. Furthermore, a step of simulation processing for finding a correction coefficient can be set in the posture control unit 490 in advance, and the correction coefficient may be found by this simulation processing. Such a correction coefficient may be input at the time of heating or before heating, or may be stored in the posture control unit 490.

It is preferable that this correction coefficient is made to be different between the time when temperature is low and when it is high. It can be changed manually or automatically when the set heating state has been reached, when the temperature of the areas to be heated H1, H2 has reached the set heating state such as from 700° C. to 800° C., for example, or when predetermined time has elapsed after the start of heating.

The posture control unit 490 in this embodiment also has a function of displacing the position of some of, or all of, the plurality of heating coils 451 during heating period.

By allowing the displacing means 460 to displace the position of each heating coil 451 by the control of the posture control unit 490, the adjustment is made so that the area where the plurality of heating coils 451 and the areas to be heated H1, H2 face each other changes in the width direction of the areas to be heated. For example, at the time of start of heating, each heating coil 451 is made to be disposed at approximately the same positions in the width direction of the areas to be heated H1, H2 of the workpiece W, and when a specified heating state is reached, the position of each heating coil 451 in the width direction of the areas to be heated H1, H2 is displaced individually, or in combination of two or more heating coils. All the heating coils 451 may be displaced.

The disposition and the amount of displacement of the plurality of heating coils may be determined based on experience, or may be determined so that they correspond to the gap between each heating coil 451 and the areas to be heated H1, H2 or the change in the gap during the heating period. Or, the deformation of the workpiece W in set heating state at the time of heating may be calculated based on the heating conditions, set heating state, etc., and the disposition and the amount of displacement may be determined so as to correspond to the calculation result. Or they may be determined so that larger area of the heating coils 451 is disposed on the lower temperature side, in response to the temperature distribution in the width direction of the areas to be heated H1, H2. Furthermore, it is also possible to set a step of simulation processing for determining the disposition of the plurality of heating coils 451 in the posture control unit 490 in advance, and determine them by this simulation processing. In this case, the deformation amount in the width direction of the areas to be heated H1, H2 is found by simulation processing, and the area may be adjusted so as to correspond to this deformation amount, or selection may be made from the compiled data on the disposition.

To displace the heating coils 451 during the heating period, some of all the heating coils 451 may be disposed by displacing them to the edge side. Or the disposition obtained by displacement may be stored in accordance with the set heating conditions in advance, and displacement may be performed manually or automatically when the set heating conditions are satisfied.

In a state where the disposition of each heating coil 451 is displaced, it is also possible to dispose a part of different heating coils 451 may be disposed at the same position in the width direction of the areas to be heated H1, H2, and the same position in the width direction of the areas to be heated H1, H2 may be heated in superposed state.

As a result, the disposition/distribution of the plurality of heating coils 451 in the width direction of the areas to be heated H1, H2 can be adjusted to differ between before and after the displacement of the heating coils 451, thus making it possible to adjust the amount of heating due to induction heating properly.

Then, the posture control unit 490 in this embodiment has a function of changing the posture of the supporting box 452, thus adjusting the posture, namely the angle of the heating coils 451 relative to the areas to be heated H1, H2, so that the face of the heating coils 451 facing the areas to be heated H1, H2 is placed along the areas to be heated H1, H2 during the heating period. In this case, adjustment is made so that the angle formed by the face of the heating coils 451 facing the areas to be heated H1, H2 and the areas to be heated H1, H2 is minimized or eliminated during the heating period. If the shape of the face of the heating coils 451 facing the areas to be heated H1, H2 is different from the shape of the areas to be heated H1, H2, it is desirable that the angle formed by the face of the heating coils 451 facing the areas to be heated H1, H2 and the areas to be heated H2 be made to be as small as possible.

The amount of adjustment of the posture of the heating coils 451. may be determined based on experiences. It can also be made to correspond to the gap between the areas to be heated H1, H2 and each heating coil 451 or to the change in the gap during heating period. Or deformation of the workpiece W in set heating state during heating may be calculated based on heating conditions, set heating state, etc., and the amount of adjustment may be determined so that it corresponds to the calculation result. It is also possible to determine the amount of adjustment so that the heating coils 451 come closer to the areas to be heated H1, H2 on the low temperature side, corresponding to the temperature distribution in the width direction of the areas to be heated H1, H2.

Furthermore, it is also possible to set a step of simulation processing to determine the posture of the plurality of heating coils 451 in the posture control unit 490 in advance, and determine the amount of adjustment by this simulation processing. In this case, the deformation amount in the width direction of the areas to be heated H1, H2 may be found by the simulation processing, and the amount of adjustment of the posture may be determined so that it corresponds to this deformation amount.

To adjust the posture of the heating coils 451 by changing its orientation during the heating period, the posture control unit 490 may be operated during the heating period based on experiences. In addition, the posture may be stored in advance in accordance with the set heating conditions, and the orientation may be changed manually or automatically when the set heating conditions are satisfied.

Figure 16:
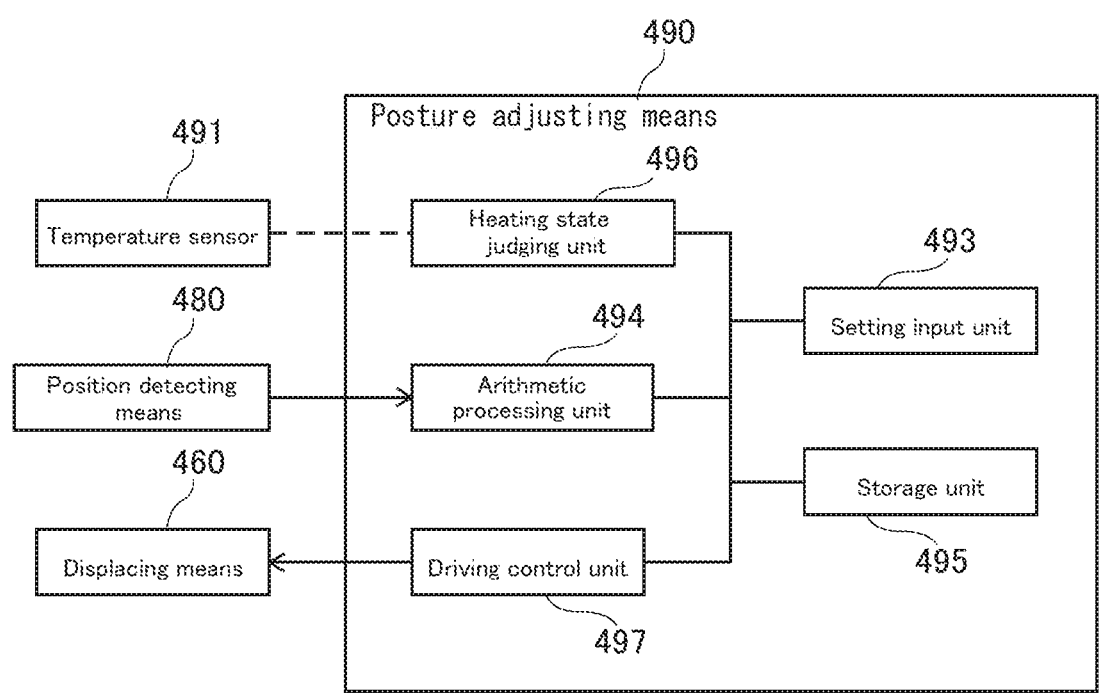
FIG. 16 is a block diagram showing a posture control unit according to the embodiment of the present invention.

As shown in FIG. 16, the posture control unit 490 in this embodiment includes: a setting input unit 493 for inputting the heating conditions and the set heating state of the workpiece W; an arithmetic processing unit 494 for calculating the amount of control of the displacing means based on the heating conditions and set heating state of the workpiece W; a storage unit 495 for storing various settings input to the setting input unit 493 and calculation results obtained by the arithmetic processing unit; a heating state evaluating unit 496 for evaluating that the heating state of the areas to be heated H1, H2 has reached the set heating state; and a driving control unit 497 for driving the displacing means 460 when the set heating state is reached. In this case, elapsed heating time is used as heating state, but it is also possible to use the temperature of the areas to be heated H1, H2 as the heating state.

In that case, as shown by the broken line in FIG. 16, the temperature of the areas to be heated H1, H2 may be detected using a non-contact temperature sensor, and the set heating state may be judged to have been reached when the heating state evaluating unit 496 judges that the temperature set in advance has been reached.

The storage unit 495 stores the steps for displacing the heating coils 451 after the start of heating, following the position of the workpiece W in the heating position P3, based on signals from the position detecting means 480. Heating conditions and informations for adjusting the position and the angle of the heating coils 451 relative to the areas to be heated H1, H2 are stored in combination with the set heating state. They may be those input at the setting input unit 493, or those found by calculation.

Furthermore, the storage unit 495 stores the processing step information used for simulation processing.

Simulation processing steps are for calculating the state of deformation when the areas to be heated H1, H2 have reached the set heating state under the heating conditions, and their methods are not limited to any specific ones. For example, simulation processing where thermal deformation is found as an analytical model by the two-dimensional finite element method (FEM) may be used.

[Power Adjusting Means]

The power adjusting means 491 is set as a part of the operating unit 710 of the power feeding equipment 700. This power adjusting means 491 adjusts the high-frequency power to be fed to the plurality of heating coils 451 separately for each of the heating coils 451. The high-frequency power may be adjusted to the value that has been set corresponding to the set heating state, when or after the predetermined set heating state is reached.

In combination with the adjustment by the posture control unit 490 of the position and angle of each heating coil 451 relative to the areas to be heated H1, H2, this power adjusting means 491 varies the high-frequency power to be fed to each heating coil 451, thus allowing the plurality of heating coils 451 to heat the areas to be heated H1, H2.

[Cooling Section]

Figure 10:
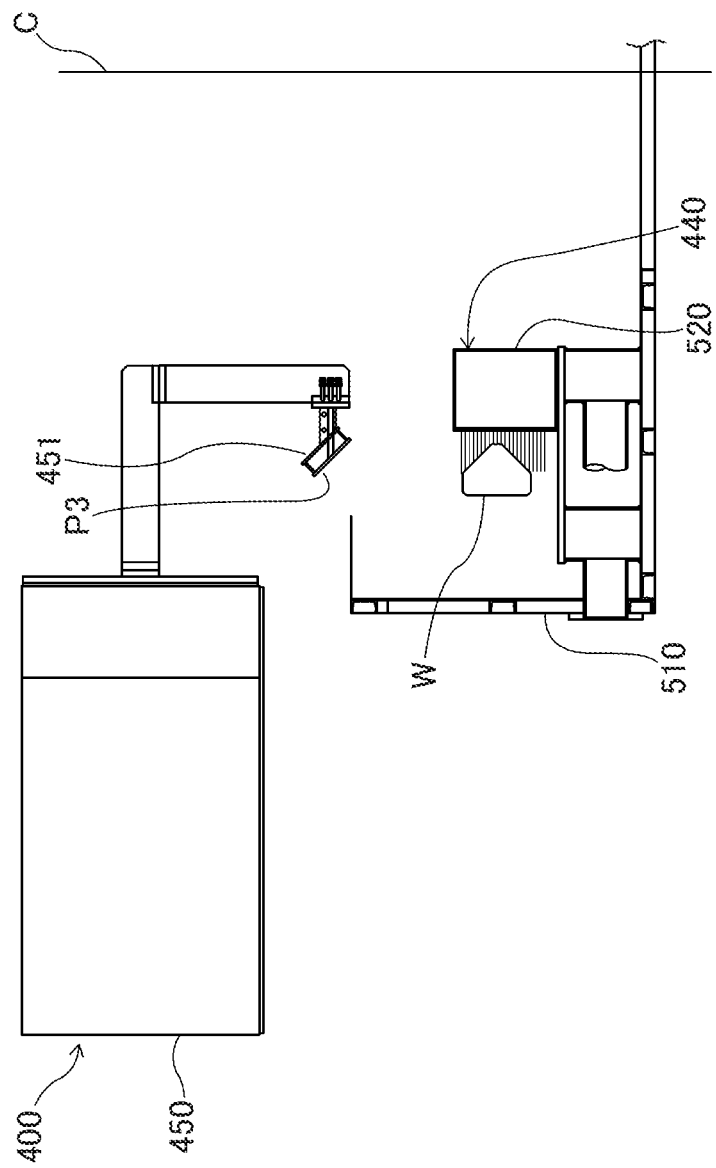
FIG. 10 is a partial cross-sectional view of a cooling section according to the embodiment of the present invention.

As shown in FIG. 10, the cooling section 500 includes: a water tank 510 installed below the heating section 400; and a plurality of cooling jackets 520 as cooling units disposed within the water tank 510, and it is capable of stably supporting the radial racks 111 of the jig 100.

The water tank 510 is installed, surrounding the jig 100 and the workpiece W, to prevent cooling liquid from splashing. The plurality of cooling jackets 520 are disposed, facing the workpiece W and at a plurality of positions in the circumferential direction of the workpiece W at mostly regular intervals, so that a large amount of cooling liquid can be discharged to the workpiece W and contact the workpiece W.

[Heat Treatment Method]

A method of heat-treating a workpiece W using such heat treatment equipment 10 will hereafter be explained.

With the heat treatment method in this embodiment, a preparation process for setting each part depending on the workpiece W, a bring-in process for bringing in the workpiece W and mounting it onto a jig 100, and a transfer process for transferring the jig 100 carrying the workpiece W are followed, and then heat treatment of one of the areas to be heated H1, H2 is performed. The heat treatment includes: a heating process for induction-heating the workpiece W on the jig 100; and a cooling process for cooling the workpiece W on the jig 100. Then the heat-treated workpiece W is discharged in the subsequent discharge process.

In the preparation process, setting of each part is made depending on the size and the shape the workpiece W to be heated. To mount the components of the heating unit 450 such as heating coils 451 to the heating unit 450, parts replacement section 600 and parts replacement jig 620 as shown in FIG. 2 and FIG. 3 can be used.

In the bring-in process, the workpiece W to be heated is brought in by the bring in/out section 300 as shown in FIG. 2 and FIG. 3, and placed on the jig 100 to be ready for being transferred.

At the bring in/out position P1 of the bring in/out section 300, the jig 100 is made to support the workpiece W. As shown in FIG. 4, the workpiece W is placed on a plurality of rotating rollers 112 of the jig 100 in a manner surrounding the central structure 130, with one edge face facing downward. Then the jig 100 carrying the workpiece W is transferred to a suspending position P2 and stopped.

In the transfer process, as shown in FIG. 3 and FIG. 4, the jig 100 carrying the workpiece W is connected to the transfer loader 220 of the transfer mechanism 200, and transferred to the heating section 400 in hoisted state.

In the heating process, the jig 100 is disposed in the specified position in the heating section 400 as shown in FIG. 2 and FIG. 8, and by disposing the jig 100 while controlling its move in the vertical and circumferential directions, the workpiece W placed on the jig 100 is disposed on each heating position P3, and one of the areas to be heated H1, is heated. Either one of the areas to be heated H1, H2 may be heated.

Figure 17:
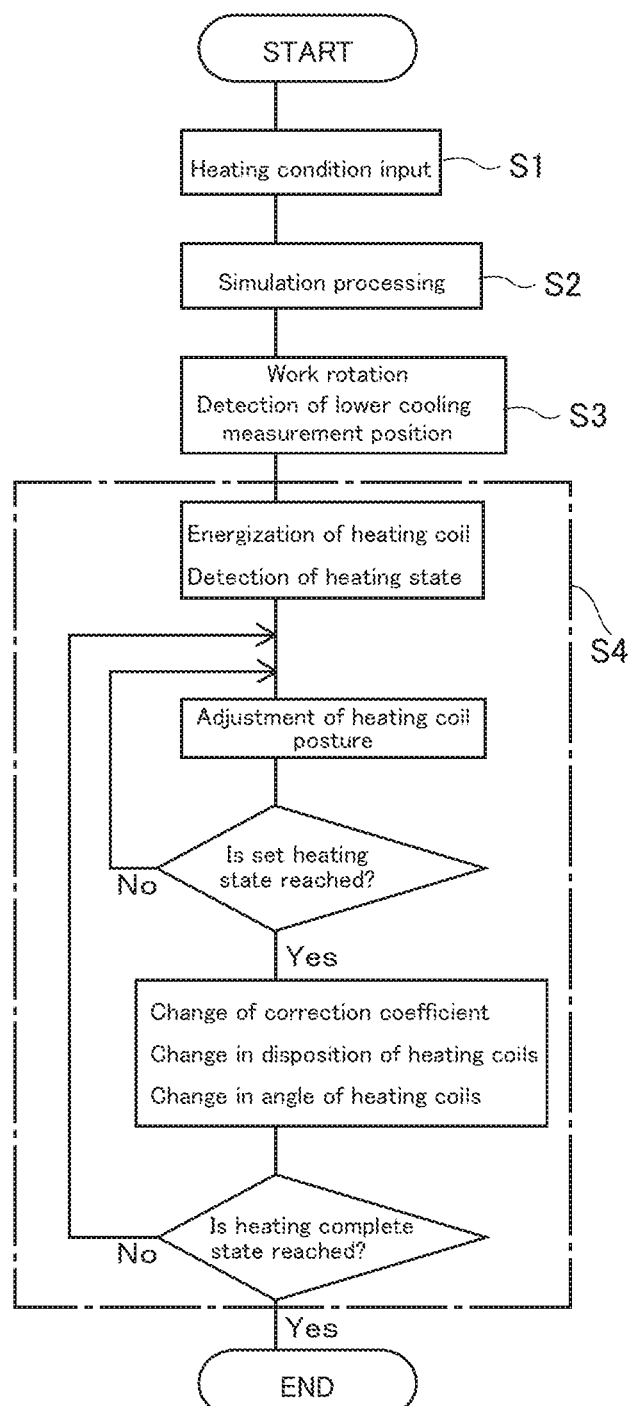
FIG. 17 is a flow chart showing the heating process according to the embodiment of the present invention.

In the heating process, heat treatment steps as shown in FIG. 17 are executed.

First, prior to the start of heat treatment, heating conditions described previously are input from the setting input unit 493 in the input process S1. This input can be made on the touch panel of the operating unit 710 or from a mobile terminal 701. A desired item is selected on the main menu as shown in FIG. 5, and on the entry screen, various heating conditions are entered. In this case, one or a plurality of set heating states are set in advance, considering expected increase in positional displacement between the measurement positions measured by the position detecting means 480 and the actually heated areas to be heated H1, H2 of the workpiece W due to increase in non-uniform deformation of the workpiece W.

In the simulation process S2, the arithmetic processing unit 494 performs simulation processing based on the entered heating conditions, following the simulation processing steps stored in the storage unit 495. In this processing, the correction coefficient in each set heating state, the disposition of each of the plurality of heating coils 451 in the width direction of the areas to be heated H1, H2, and the inclination of each heating coil 451 are calculated, and each of the obtained calculation results are stored in the storage unit 495 in a state corresponding to each set heating state.

After the simulation process S2, in a state where the workpiece W is placed at each heating position P3 in the treatment starting process S3, the rotating roller 112 is rotated to allow the workpiece W to rotate along the ring shape, and the circumferential speed of the workpiece W is maintained constant by the rotation driving unit 30. As shown in FIG. 9, the contactors 488 of the position detectors 483, 484 are made to contact the middle and the upper face on the outer peripheral surface of the workpiece W to measure the measurement positions. As shown in FIG. 8, cooling liquid is injected from an auxiliary cooling unit 440 to the lower side adjacent to the areas to be heated H1, H2 to start cooling.

The displacing means 460 is actuated by the control of the posture control unit 490 to displace the heating coils 451 so that the heating coils 451 are disposed facing the areas to be heated H1, H2 while a specified gap is maintained. In this case, when the heating is started, the deformation of the workpiece W and the measurement positions measured by the position detecting means 480 are approximately coincided, and consequently, correction coefficient can be 1. Furthermore, since the heating coil 451 is supported by the supporting box 452 so that its inclination corresponds to the inclination of the areas to be heated H1, H2 in the width direction, the supporting box 452 of the displaying means 460 is in an approximately horizontal state, meaning that there is no difference in relative angle between the heating coils 451 and the areas to be heated H1, H2. In addition, the plurality of heating coils 451 may be arranged around the central line of the areas to be heated H1, H2 in the width direction.

In this state, the inducting heating treatment process S4 is started. In the induction heating treatment process S4, while measurement of rotation, cooling and measurement positions of the workpiece W is continued, high-frequency power is fed to the heating coils 451 to subject the areas to be heated H1, H2 to induction heating.

By detecting the amount of displacement of the contactors 488 of the radial position detector 483 and the axial position detector 484 of each position detecting means 480 using a variation detector 489, the measurement position of the areas to be heated H1, H2 at each heating position P3 is measured. As a result, heating can be performed while each heating coil 451 is made to follow the workpiece W. For example, even in a case where the workpiece W is rotated while its position is displaced in the radial direction because the workpiece W is disposed eccentrically with respect to the center of the jig 100 and other reasons, the heating coil 451 can be made to follow the workpiece W for heating.

In this induction heating treatment process S4, the heating state is continuously detected after the start of heating, and the elapsed heating time after the start of heating is detected as the heating state.

Because the workpiece W is large and heating is performed using the plurality of heating coils 451 disposed at intervals in the circumferential direction, the heating period of the induction heating treatment process S4 may become as long as several minutes. During this heating period, the heating state and the position of the workpiece W are monitored, and workers can check them on the monitor screen, etc. of the operating unit 710 or the mobile terminal 701.

As a result of performing the induction heating treatment as described above continuously, the areas to be heated H1, H2 and the workpiece W are heated. At the same time, the workpiece W is deformed gradually and non-uniformly due to thermal expansion.

When the heating state is then judged to have reached to the set heating state by the heating state evaluating unit 496, the arithmetic processing unit 494 changes the correction coefficient to the one in the set heating state stored in the storage unit 495. By using this correction coefficient, the measurement position measured by the position detecting means 480 is corrected to calculate the corrected position. As a result, in a high-temperature state after the set heating conditions are satisfied, following operation is performed, with the position of the areas to be heated H1, H2 at each heating position P3 regarded as corrected position, until the next set heating conditions are satisfied. Namely, the operation of the displacing means 460 are controlled by the posture control unit 490 to allow it to correspond to the change in the corrected position, and thus the relative position of the heating coil 451 and the areas to be heated is maintained stably.

When the heating state is judged to have reached to the set heating state, the arithmetic processing unit 494 finds the amount of control that allows the inclination of each heating coil 451 in set heating state stored in the storage unit 495 to be ensured, and the posture control unit 490 controls the operation of the displacing means 460 based on that amount of control. By allowing an angle changing unit 492 to raise or lower the top part of the supporting box 452 so that its height becomes different between the front and the rear sides, the inclination angle of the surface of the heating coils 451 facing the areas to be heated H1, H2 is adjusted to coincide with the inclination angle of each heating coil 451 in the set heating state.

Figure 18:
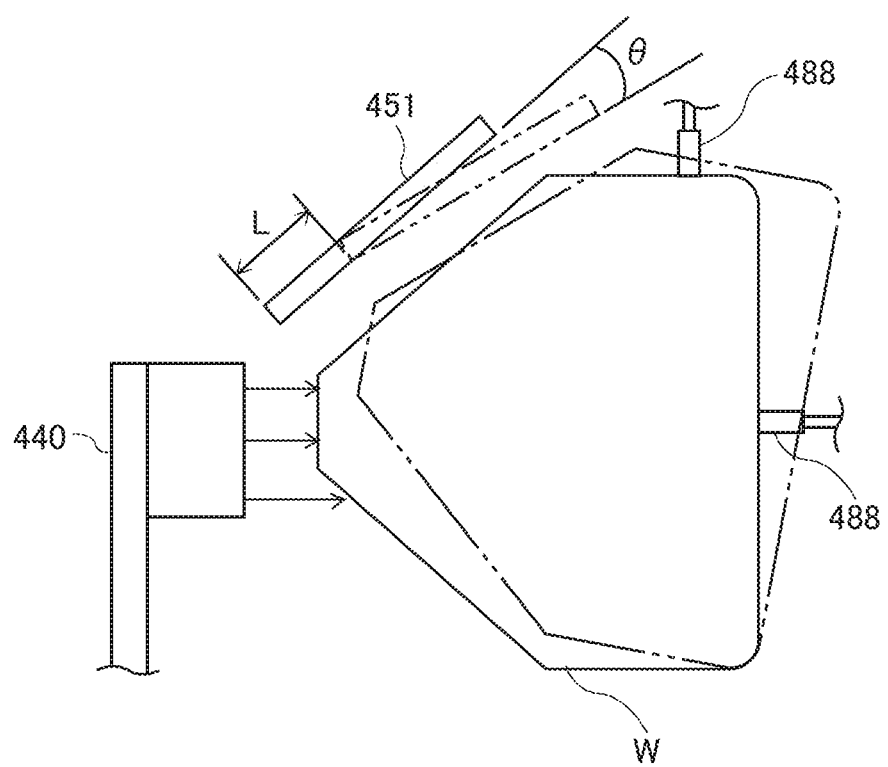
FIG. 18 is a schematic cross-sectional diagram showing the heated state of the workpiece in the heat treatment equipment according to the embodiment of the present invention, exaggeratingly displaying the deformation.

For example, as shown in FIG. 18, until the set heating state is reached, each heating coil 451 is arranged, inclined as shown by the solid line in the figure. After the set heating state is reached, since the inclination of the areas to be heated H1, H2 changes due to non-uniform deformation of the workpiece W, the inclination is made to change by angle θ as shown by the virtual line in the figure so as to correspond to this change to make the gap between each heating coil 451 and the areas to be heated H1, H2 more uniform.

In the high-temperature state after the set heating conditions are satisfied, this angle is maintained until the next set heating conditions are satisfied.

Further, when the heating state is judged to have reached the set heating state, the arithmetic processing unit 494 finds the amount of control that allows the inclination of each heating coil 451 in set heating state stored in the storage unit 495 to be ensured, and the posture control unit 490 controls the operation of the displacing means 460 based on that amount of control. In this case, since the edge of the areas to be heated in the width direction, the top edge in particular, changes its position in a direction apart from each heating coil 451 due to non-uniform deformation of the workpiece W, for example, the surface temperature of the areas to be heated H1, H2 becomes non-uniform, thus tending to become lower than the temperature of the intermediate part, because the calorific value due to induction heating tends to become lower than that of the intermediate part.

Figure 19:
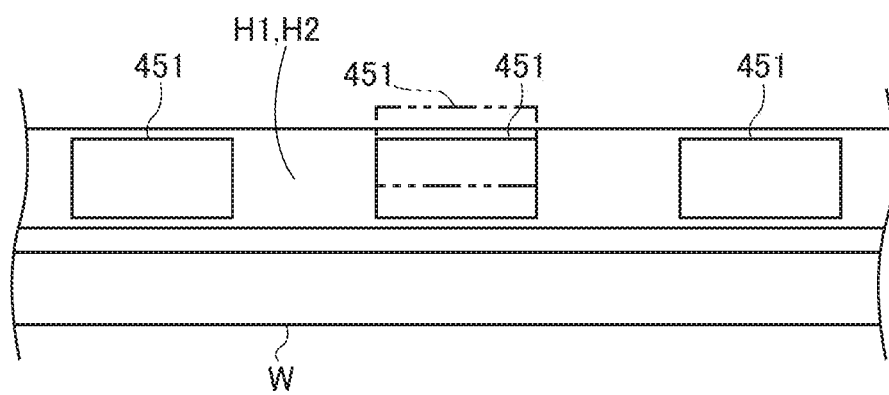
FIG. 19 is a development view showing the disposition of coils in the heat treatment equipment according to the embodiment of the present invention.

Consequently, as shown by the solid line in FIG. 19, whereas the plurality of heating coils 451 are disposed uniformly in the width direction of the areas to be heated H1, H2 before the set heating state is reached, some of the plurality of heating coils 451 are disposed, deviated toward the edge of the areas to be heated H1, H2 as shown by the virtual line in the figure. All of the plurality of heating coils 451 may be disposed, deviated toward the edge, as required. As a result, distribution of the areas of the heating coils 451 facing the areas to be heated H1, H2 in the width direction is adjusted, and each heating coil 451 is disposed so that the areas facing each other become larger on the low-temperature side of the areas to be heated H1, H2 to increase the calorific value on the low-temperature side.

In the high-temperature state after the set heating conditions are satisfied, this angle is maintained until the next set heating conditions are satisfied.

By performing such control once or performing it repeatedly, the induction heating treatment process S4 is followed until heating complete state is reached, and thus the entire areas to be heated H1, H2 are heated uniformly. When the temperature of the areas to be heated H1, H2 has reached a desired temperature, or when the predetermined heating time has elapsed, the induction heating treatment process S4 is completed.

In the cooling process after the induction heating treatment process S4 is completed, the jig 100 is lowered by the transfer loader unit 220, the workpiece W on the jig 100 is placed in the cooling section 500, and a large amount of cooling liquid is injected to the workpiece W from the cooling jackets 520 installed at a plurality of positions to cool the entire workpiece W. In this case, since the cooling section 500 is installed below the heating section 400, cooling is started in a short time after the heating, and thus a desired heat treatment of the workpiece W is performed.

When the temperature of the areas to be heated H1, H2 have decreased sufficiently, the cooling process is completed. The heat treatment of one of the areas to be heated H1, H2 has thus completed.

Then the workpiece W having undergone heat treatment is suspended in the transfer loader unit 220 along with the jig 100, and it is transferred to the bring in/out section 300. Heat treatment of the workpiece W is thus completed.

[Functional Effect in the Embodiment]

According to the heat treatment equipment 10 and the heat treatment method as described above, the deformation amount that appears on one edge of the areas to be heated H when the workpiece W is induction-heated differs from that on the other. Consequently, even if the error of the measurement positions detected by the position detecting means 480 increases, the measurement positions are corrected based on the shape of the workpiece, and the relative position of the workpiece W and the heating coils 451 is adjusted. The temperature of the entire areas to be heated H1, H2 can thus be increased to a desired level uniformly.

In this case, the posture control unit 490 is equipped with an arithmetic processing unit 494 for calculating the corrected positions based on the measurement positions and correction coefficient, and arithmetic processing unit 494 finds the correction coefficient by predetermined simulation processing for the case where heating treatment of the workpiece W is performed under the heating conditions that are to be followed. Consequently, there is no need to make preparations to determine correction coefficient, and thus provision of devices for heating the workpiece W or the time and efforts can be minimized.

The measurement positions are measured as deviations from the reference position, and the corrected positions are the corrected deviations obtained by correcting the measured deviations. The posture control unit 490 controls the operation of the displacing means 460 to eliminate the deviation in correction. As a result, the data showing the measurement positions and corrected positions can be simplified, and the structure for measuring the measurement positions by the position detecting means 480 or the structure for transferring the heating coils 451 to corrected positions by the displacing means 460 can be simplified. In addition, the processing speed can be improved and the heating coils 451 can thus be placed in appropriate positions in a shorter time, and the areas to be heated H1, H2 can be heated efficiently.

The corrected positions are those obtained by correcting the measurement positions using a correction coefficient at least corresponding to the shape of the workpiece W. Consequently, the corrected positions can be calculated easily. The posture control unit 490 changes the correction coefficient when the predetermined set heating state of the areas to be heated H1, H2 is reached during the heating period. As a result, even if the amount of non-uniform deformation of the workpiece W increases with the increase in temperature, the heating coils 451 can be disposed in appropriate positions.

According to the heat, treatment equipment 10 and the heating method as described above, even if the deformation amount that appears on one edge of the areas to be heated H when the workpiece W is induction-heated differs from that on the other, the heating coils 451 are disposed in appropriate positions. It is because that the heating coils 451 are arranged along the areas to be heated H at the time of heating, and not along the areas to be heated H before the heating. Consequently, the areas to be heated H, whose temperature has increased, can be heated sufficiently using the heating coils 451. Thus the temperature of the entire areas to be heated H can be increased uniformly to a desired level.

In this case, the arithmetic processing unit 494 is provided to calculate the relative angle between the surface of each heating coil 451 facing the areas to be heated H and the areas to be heated in the set heating state of the areas to be heated H. It is therefore possible to find the relative angle automatically from detection result, etc.

Furthermore, since this relative angle is calculated by predetermined simulation processing, the preparation of finding the relative angle in advance is unnecessary, minimizing the time and the labor of the heat treatment.

The displacing means 460 is provided to change the angle of the heating coils 451 facing the areas to be heated H relative to the areas to be heated H around the axis along one direction. Namely, it is possible to change the orientation of the heating coils 451 easily along the direction of change in the areas to be heated during heating. The gap between the surface of the heating coils 451 facing the areas to be heated H and the areas to be heated of the workpiece W can thus be made to be uniform easily.

The posture control unit 490 is provided to control the operation of the displacing means 460. The adjustment is made by this posture control unit 490 so that the difference in angle between the surface of the heating coils 451 facing the areas to be heated H and the areas to be heated H is eliminated during heating. As a result, the orientation of the heating coils 451 can be changed easily.

According to the heat treatment equipment 10 and the heating method as mentioned above, by providing a displacing means 460 for separately changing the positions of the plurality of heating coils 451 in the width direction of the areas to be heated H, and allowing this displacing means 460 to change the position of each heating coil 451, disposition/distribution of the plurality of heating coils 451 in the width direction of the areas to be heated H is adjusted. The region heated by induction heating can thus be adjusted for each of the heating coils 451. As a result, the calorific value distribution in the width direction of the areas to be heated H can be adjusted, the temperature of the areas to be heated H is prevented from becoming non-uniform in the width direction of the areas to be heated H, and the temperature of the entire areas to be heated H can be increased uniformly to a specified level.

The power adjusting means 491 for individually adjusting the high-frequency power to be fed to each heating coil 451 is provided. The areas to be heated H are heated by adjusting the position of each heating coil 451 and at the same time varying the high-frequency power to be fed to each heating coil 451 by this power adjusting means 491. Consequently, the calorific value distribution in the width direction of the areas to be heated H can be adjusted more appropriately, and the temperature of the entire areas to be heated H can thus be increased to a specified level easily and uniformly.

Since the plurality of coils are of the same shape, a plurality of heating coils 451 can be manufactured easily, and correction coefficient can be manufactured at lower cost.

The posture control unit 490 is provided to control the operation of each displacing means 460, and the posture control unit 490 changes the position of each heating coil 451 corresponding to the gap between the areas to be heated H and each heating coil 451. As a result, if the workpiece W deforms non-uniformly due to temperature increase, the time and effort for adjusting the orientation of the heating coils 451 can be minimized or eliminated.

Since the posture control unit 490 changes the position of the plurality of heating coils 451 during the heating period, the entire width of the areas to be heated H can be heated uniformly even if the workpiece W deforms significantly in high-temperature state.

The above embodiment can be modified as required within the scope of the present invention.

For example, in the above embodiment, the measurement positions detected by the position detecting means 480 are corrected, and at the same time the plurality of heating coils 451 are disposed by adjusting the disposition/distribution of the plurality of heating coils 451 in the width direction of the areas to be heated H1, H2, and adjusting the angle of the heating coils 451 to allow it to correspond to the areas to be heated H1, H2 during heating. It is possible, however, to minimize the non-uniform heating state of the areas to be heated to ensure uniform heating by more appropriately correcting the measurement positions detected by the position detecting means 480 without adjusting the disposition/distribution and the angle of heating coils 451. It is also possible to minimize non-uniform heating state of the areas to be heated to ensure uniform heating by disposing the heating coils 451 while adjusting their angle to allow them to correspond to the areas to be heated H1, H2 during heating without correcting the measurement positions or adjusting the disposition/distribution of the heating coils 451. Furthermore, it is possible to minimize non-uniform heating state of the areas to be heated to ensure uniformity by adjusting the disposition/distribution of the plurality of heating coils 451 in the width direction of the areas to be heated H1, H2 more appropriately without correcting measurement positions and adjusting the angle of heating coils 451.

An example where the workpiece W and the heating coils 451 are moved relative to each other by rotating the workpiece W with respect to the heating coils 451 was explained above. However, it is also possible to ensure relative move by rotating the heating coils 451.

An example where the angle of the heating coils 451 is adjusted during the heating period was explained above. It is also possible to dispose the face of the heating coils 451 facing the areas to be heated H1, H2 in a fixed manner in advance so as to correspond to the areas to be heated H1, H2 during the heating period.

An example where all the heating coils 451 are displaced separately by the displacing means 460 was explained above, but the displacement of combinations of a plurality of heating coil 451, two heating coils for example, is also possible.

Taking the displacement of the gap and occurrence of non-uniform temperature distribution of the areas to be heated H1, H2 into consideration, the disposition of the plurality of heating coils 451 may be adjusted in advance in order to cope with the occurrence of the above, thus ensuring uniform heating.

The present invention is also applicable to a workpiece W where the deformation amount that appears on one edge of the areas to be heated H1, H2 when the areas to be heated are induction-heated is not different from that on the other. Namely, by applying the present invention while the temperature distribution of the areas to be heated H1, H2 is non-uniform during heating, and adjusting the disposition of each heating coil 451, the unevenness of heating state is minimized to ensure uniform heating. An example where the width of the areas to be heated H1, H2 and the width of the heating coils 451 are similar was explained above. However, the present invention is also applicable to a case where the heating is performed using a plurality of heating coils 451 having a width smaller than the width of the areas to be heated H1, H2. In this case, when heating a workpiece W, where the entire length of the areas to be heated H1, H2 is divided into belt-like divisions having different lengths laid next to each other in the width direction using a plurality of heating coils 451 having a width narrower than the width of the areas to be heated H1, H2, the plurality of heating coils 451 may be disposed so that the area of the heating coils 451 facing the workpiece is set depending on the length of the belt-like divisions. For example, more heating coils 451 of the same shape may be disposed in longer divisions than in shorter ones.

Second Embodiment

A second embodiment is an example of subjecting both areas to be heated H1, H2 of the workpiece W to heat treatment using the same heat treatment equipment as the first embodiment.

In the heat treatment method of this second embodiment, a preparation process, a bring-in process, and a transfer process are followed, and after the workpiece W is transferred to the heating section 400, the heat treatment of each areas to be heated H1, H2 is performed. In this heat treatment, the areas to be heated H1, H2 are subjected to heat treatment sequentially.

Figure 21:
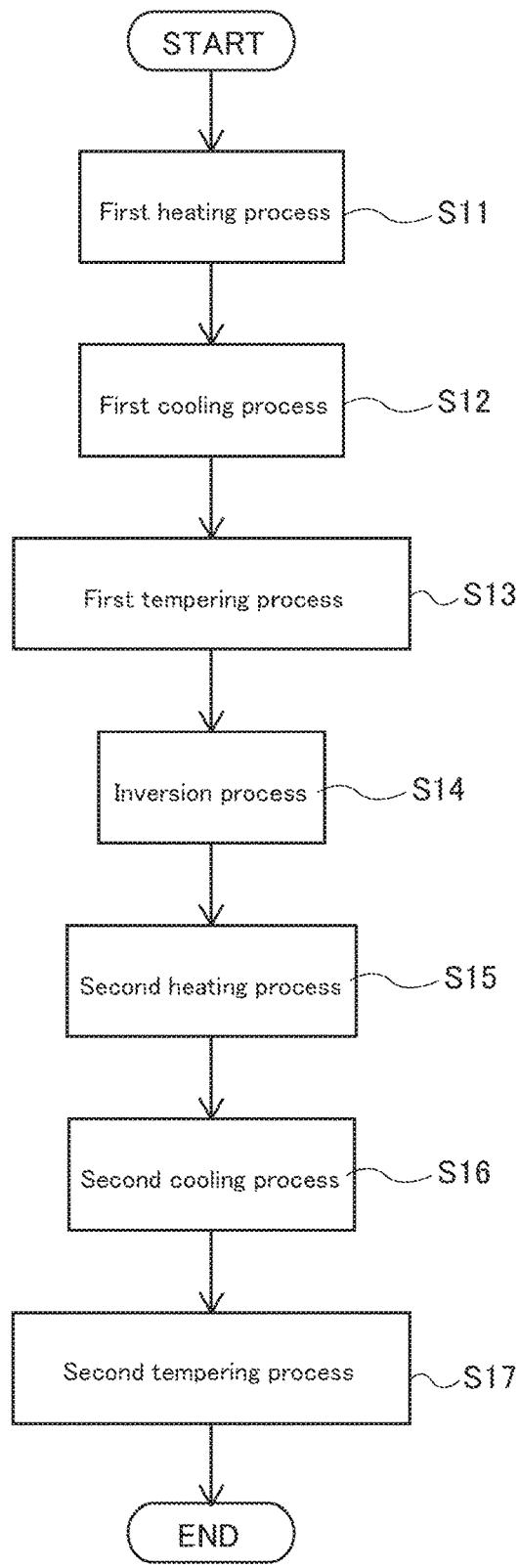
FIG. 21 is a flow chart showing the process of subjecting the first area to be heated and the second area to be heated to heat treatment according to the embodiment of the present invention.

Specifically, as shown in FIG. 21, this embodiment includes: a first heating process S11 for heating a first area to be heat-treated H1 of the workpiece W placed on a jig 100; a first cooling process S12 for rapidly cooling the first area to be heat-treated H1 that has been heated; a first tempering process S13 for heating and gradually cooling the first area to be heat-treated H1 after the first cooling process S12; next, an inversion process S14 for inverting the workpiece and placing it on the jig 100 after the first tempering process S13. After the inversion process S14, this embodiment includes: a second heating process S15 for heating the second area to be heat-treated H2 of the inverted workpiece W; a second cooling process S16 for rapidly cooling the second area to be heat-treated H2 that has been heated; and a second tempering process S17 for heating and gradually cooling the second area to be heat-treated H2 after the second cooling process S16.

Figure 22:
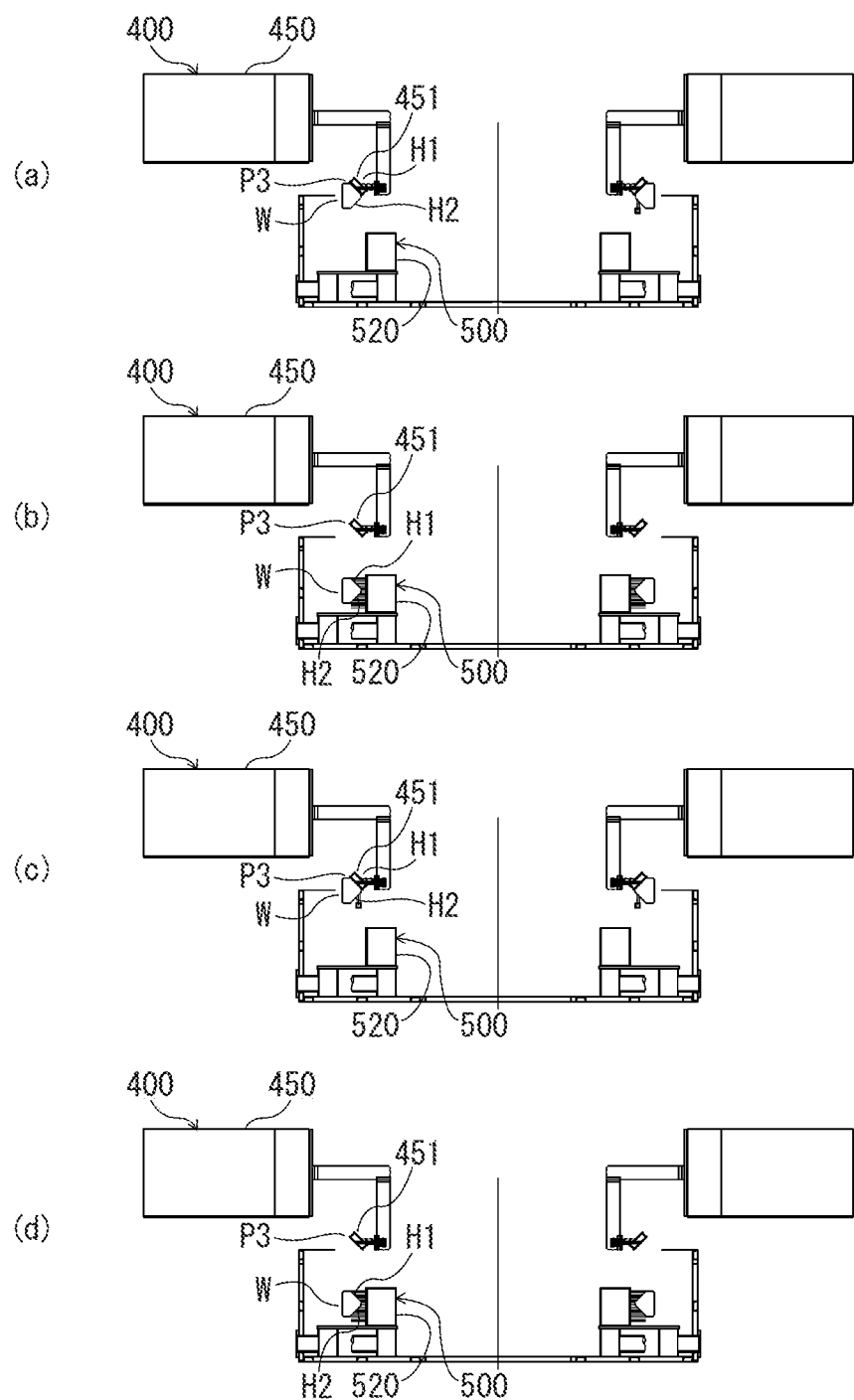
FIGS. 22 (a) to (d) are charts describing heat treatment procedures of the first area to be heated according to the embodiment of the present invention.

In the first heating process S11, as shown in FIG. 8 (*a*) and FIG. 22 (*b*), the jig 100 is placed at a specified position in the heating section 400, and by disposing the jig 100 while regulating its move in vertical and circumferential directions, the first area to be heat-treated H1 of the workpiece W placed on the jig 100 is disposed at each heating position P3 for heating.

Rotation and cooling of the workpiece W are performed continuously, and at the same time, the heating coils 451 are made to follow the surface of the workpiece W, and high-frequency power is fed to the heating coils 451 to perform induction heating of the first area to be heat-treated H1.

By detecting the position of the workpiece W in the radial and axial directions using each position detecting means 480, the position of the first area to be heat-treated H1 at each heating position P3 is calculated. To that end, the displacing means 460 is actuated, and heating is performed while each heating coil 451 is made to follow the workpiece W. For example, even in a case where the workpiece W is rotated while being displaced in the radial direction during turning as a result of being disposed eccentrically from the center of the jig 100, the heating coils 451 can be made to follow the workpiece W for heating.

The temperature of the first area to be heat-treated H1 increases by continuously performing induction heating. A cooling liquid is continuously sprayed to the workpiece W from the auxiliary cooling unit 440 during heating to prevent the temperature of the areas other than the first area to be heat-treated H1, the second area to be heat-treated H2 in particular, from increasing to heat treatment temperature.

Heating is continued until the specified heating complete state is reached to heat the entire area to be heat-treated H1 uniformly. For example, when the temperature of the first area to be heat-treated H1 has reached a desired temperature, such as A3 transformation point or A1 transformation point or higher for example, and the predetermined heating time has expired, the first heating process S11 is completed.

In the first cooling process S12, as shown in FIG. 10 and FIG. 22 (b), the jig 100 is lowered by the transfer loader unit 220 after the first heating process S11 is completed, the workpiece on the jig 100 is disposed on the cooling section 500, and while the workpiece W is being rotated, a large amount of cooling liquid is injected to the workpiece W from cooling jackets 520 installed at a plurality of positions to rapidly cool the entire first area to be heat-treated H1 of the workpiece W. Tempering of the first area to be heat-treated H1 is thus performed. In this case, since the cooling section 500 is installed below the heating section 400, the cooling is started in a short time after the heating. Desired tempering of the workpiece W is thus performed. When the temperature of the first area to be heat-treated H1 or the workpiece W has decreased to sufficiently low level, the cooling process is completed.

After the first cooling process S12, as shown FIG. 8 (a) and FIG. 22 (c), the first tempering process S13 for heating and gradually cooling the first area to be heat-treated H1 is performed.

In this first tempering process S13, the jig 100 as shown in FIG. 8 (a) is raised and disposed by the transfer loader unit 220, while the transfer of the jig 100 in the vertical and the circumferential directions is regulated in the heating section 400, and the first area to be heat-treated H1 of the workpiece W placed on the jig 100 is disposed at each heating position P3 and heated. During heating, all of or some of the same heating coils 451 used in the first heating process S11 are used. While rotation and cooling of the workpiece W are performed and the heating coils 451 are made to follow the surface of the workpiece W, power is fed to the heating coils 451 to perform induction heating, thus heating the surface temperature of the first area to be heat-treated to 170° C. to 200° C., for example. After the predetermined time has elapsed, cooling is performed in the atmosphere, for example. The workpiece W is thus subjected to low-temperature tempering, and the hard and brittle structure formed in the first heating process S11 and the first cooling process S12 is transformed into a tempered structure having improved toughness, for example.

Then, as shown in FIG. 10 and FIG. 22 (d), the jig 100 as shown in FIG. 8 (a) is lowered again by the transfer loader unit 220, the workpiece W on the jig 100 is disposed in the cooling section 500, and while the workpiece W is rotated, a large amount of cooling liquid is injected to the workpiece W from the cooling jackets 520 installed at a plurality of positions to cool the entire workpiece W to sufficiently low temperature.

After the first tempering process S13 is completed, inversion process S14 where the workpiece W is inverted vertically and placed on the jig 100 shown in FIG. 8 (a) is followed. In the inversion process S14, the orientation of both edges of the workpiece W is inverted. Consequently, the first area to be heat-treated H1 is placed at the bottom, whereas the second area to be heat-treated H2 is placed at the top.

Next, the jig 100 on which the workpiece W is placed as shown in FIG. 8 (a) is then transferred to dispose the second area to be heat-treated H2 of the workpiece W at each heating position P3.

After the inversion process S14 is completed, a second heating process S15 for heating the second area to be heat-treated H2 of the workpiece W is followed. Since the first area to be heat-treated H1 and the second area to be heat-treated H2 of the workpiece W are in plane-symmetrical shape in this embodiment, and by inverting the workpiece W, the second area to be heat-treated H2 can be disposed similarly to the first area to be heat-treated H1 before the inversion, the same heating coils 451 used in the first heating process S11 are used in the second heating process S15.

Figure 23:
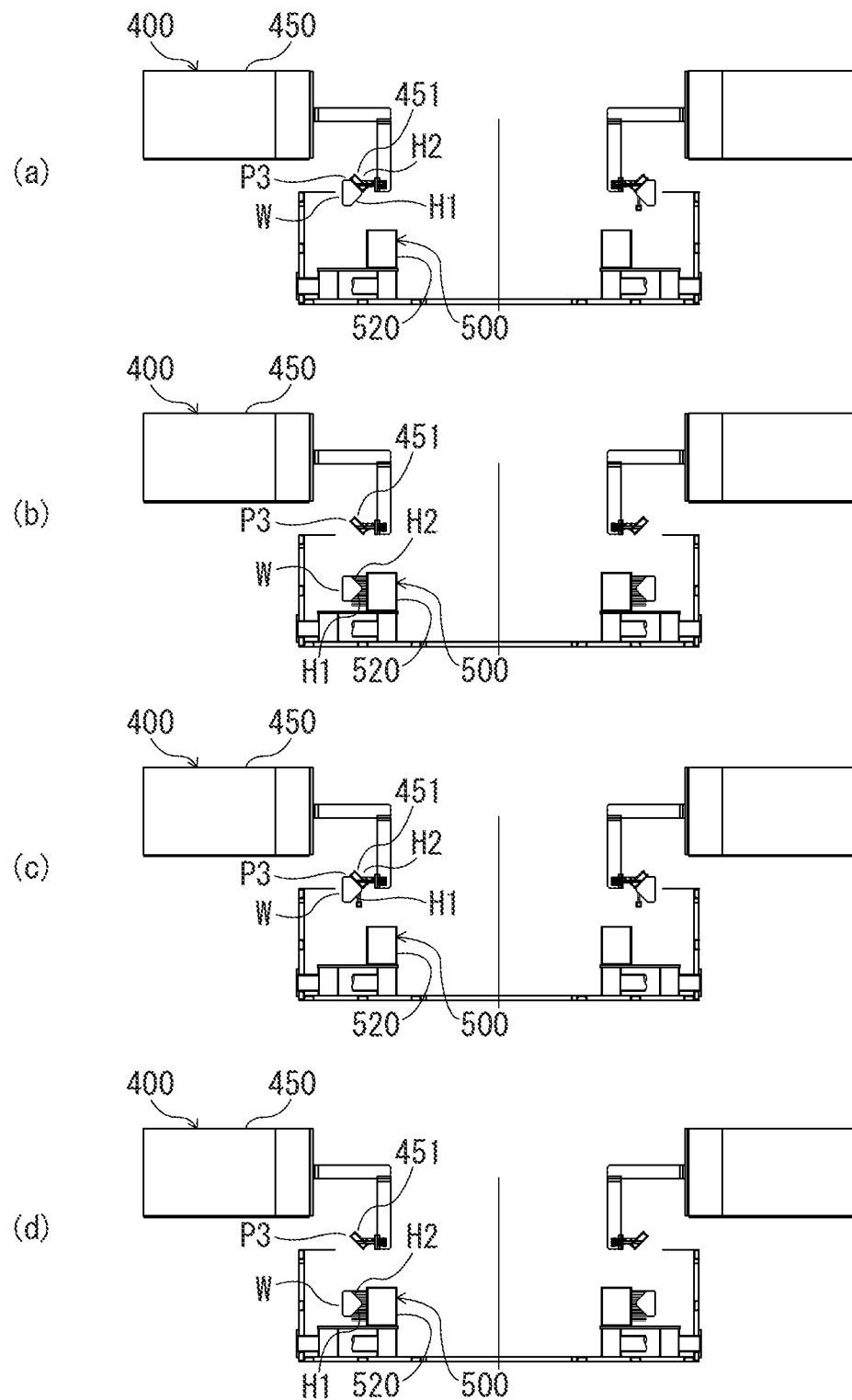
FIGS. 23 (a) to (d) are charts describing heat treatment procedures of the second area to be heated according to the embodiment of the present invention.

In the second heating process S15, as shown in FIG. 8 (a) and FIG. 23 (a), the second area to be heat-treated H2 of the workpiece W placed on the jig 100 is heated in the same manner as the first heating process S11. While the second area to be heat-treated H2 is heated, cooling liquid is continuously sprayed to the second area to be heat-treated H2 from the auxiliary cooling unit 440 to prevent the temperature of the second area to be heat-treated H2 from increasing to heat treatment temperatures such as A1 and A3 transformation points or higher without fail.

After the second heating process S15 is completed, a second cooling process S16 is followed. In the second cooling process S16, as shown in FIG. 10 and FIG. 23 (b), the heated second area to be heat-treated H2 is transferred to the cooling section 500 immediately for rapid cooling as in the same manner as the first cooling process S12. The second area to be heat-treated H2 is thus subjected to tempering.

In this embodiment, a second tempering process S17 is followed after the second cooling process S16. The second tempering process S17 is followed in the same manner as the first tempering process S13, as shown in FIG. 8 (a) and FIG. 23 (c). Namely, the jig 100 is raised, the second area to be heat-treated H2 of the workpiece W placed on the jig 100 is disposed at each heating position P3 and heated to 170° C. to 200° C., for example, using all or some of the heating coils 451 used in the second heating process S15, and then cooled in the atmosphere. The workpiece W is thus subjected to low-temperature tempering, and the hard and brittle structure formed in the second heating process S15 and the second cooling process S16 is transformed into a tempered structure having improved toughness, for example.

Next, as shown in FIG. 10 and FIG. 23 (d), the jig 100 as shown in FIG. 8 (a) is then lowered again by the transfer loader unit 220, the workpiece W on the jig 100 is disposed in the cooling section. 500, and while the workpiece W is rotated, a large amount of cooling liquid is injected to the workpiece W from the cooling jackets 520 installed at a plurality of positions to cool the entire workpiece W.

The tempered workpiece W is then suspended with the jig 100 by the transfer loader unit 220, transferred to the bring in/out section 300 as shown in FIG. 3, and the heat treatment of the entire areas to be heat-treated H1, H2 of the workpiece W is thus completed.

According to the heat treatment method as described above, since ring-shaped areas to be heated H1, H2 corresponding to the shape of the workpiece W are provided at a plurality of positions of the ring-shaped workpiece W, and the plurality of areas to be heat-treated H1, H2 are subjected to heat treatment sequentially, heating can be performed by the heating unit 450 corresponding only to the shape of the areas to be heat-treated H1, H2, regardless of the size and shape of the workpiece W. As a result, the heating unit 450 can be made to be in a simple structure independent of the size of the workpiece W or the shape of the workpiece W itself. In addition, unlike the case where all the areas to be heat-treated H1, H2 of the workpiece W are heated simultaneously, the power required for heating at the same time is smaller, and thus the power feeding equipment can be made to be in a simple structure.

Furthermore, according to this heat treatment method, when the ring-shaped areas to be heat-treated H1, H2 provided locally at a plurality of positions of the ring-shaped workpiece W along the shape of the workpiece are sequentially subjected to heat treatment, heat treatment of the first area to be heat-treated H1 is performed in the first heating process S11 and the first cooling process S12, the tempering of the first area to be heat-treated H1 is performed by heating and cooling the first area to be heat-treated H1 in the first tempering process S13, and then the second area to be heat-treated H2 is heated. Consequently, occurrence of heat treatment defects such as deformation and hardening cracks can be decreased or prevented during the time until the second area to be heat-treated H2 is heated, or during heating.

In this case, the workpiece W where the deformation amount on one edge of the second area to be heat-treated H2 caused by the heating of the second area to be heat-treated H2 differs from that on the other is used. With such a workpiece W, since the workpiece W deforms non-uniformly when the area to be heat-treated H2 is heated, heat treatment defects such as deformation and hardening cracks tend to occur in the first area to be heat-treated H1. In this embodiment, however, by performing tempering, heat treatment defects can be prevented effectively.

The heat treatment method in this embodiment performs induction heating using the same heating coils 451 in the first heating process S11 and the first tempering process S13. It is therefore unnecessary to provide heating coils 451 separately, and so the structure of the heat treatment equipment 10 can be simplified.

In addition, in the first heating process S11 and the second heating process S15, the first area to be heat-treated H1 and the second area to be heat-treated H2 are induction-heated by using the same heating coils 451. It is therefore unnecessary to provide heating coils 451 separately, and so the structure of the heat treatment equipment 10 can be simplified.

Furthermore, the first area to be heat-treated H1 and the second area to be heat-treated H2 are in plane-symmetrical shape, and after the first tempering process S13, induction heating is performed with the workpiece W inversed. It is therefore possible to share the heating coils 451, and in addition, the positional adjustment of heating coils 451, etc. can also be simplified, and the heat treatment of workpieces W having a plurality of areas to be heat-treated H1, H2 can be facilitated.

The above embodiment can be modified as required within the scope of the present invention. The example where a workpiece W having two areas to be heated, namely the first area to be heat-treated H1 and the second area to be heat-treated H2, was subjected to heat treatment was explained. However, any number of areas to be heated can be adopted, provided that it is two or more. When ring-shaped areas to be heated are provided at three or more positions, by following tempering process every time quenching of each area to be heated is completed during sequential heating of the areas to be heated, occurrence of heat treatment defects such as hardening cracks and deformation can be suppressed when the next area to be heated is subjected to heat treatment.

The case where the first area to be heated H1 and the second area to be heated H2 are in plane-symmetrical shape was explained above. Even if the inclination, width, etc. of the second area to be heated H2 differ from those of the first area to be heated H1 when the workpiece W is inverted, by adjusting the disposition and orientation of the plurality of heating coils 451, the second heating process S15 can be followed using the same heating coils 451.

In addition, if the shape of the first area to be heated H1 and that of the second area to be heated H2 are completely different, it is possible to apply the present invention as well by performing heating by replacing the heating coils 451 for the first heating process S11 and for the second heating process S15.

The example where the workpiece W was in the shape of a ring was explained above. However, the workpiece W may also be in a form of a plate, rod, bulk, etc., on condition that a plurality of areas to be heated H1, H2 can be provided in a shape of a ring.

In the above description, the temperature was increased to 170° C. to 200° C. and cooling was performed in the atmosphere of the air in the first tempering process S13 and the second tempering process S17, but it is also possible to adopt other methods.

LIST OF SYMBOLS

W: Workpiece
W1: Base
W2: Protrusion
W3: Inclined surface
H1, H2: Areas to be heated
C: Rotation center
P1: Bring in/out position
P2: Suspending position
P3: Heating position
10: Heat treatment equipment (heating device)
12, 12A, 12B, 12C: Transformer
13, 13A, 13B, 13C: Matching unit
14: Inverter
14A: Rectifier unit
14B: Inverter unit
15: Inverter control unit
15A: Rectification control unit
15B: Inversion control unit
16: Group of switches
16A, 16B, 16C, 16D, 16E: Switches 17: Switching control unit
18: Setting unit
19: Commercial power supply
40: Heating/cooling rack
42: Displacement rack
43: Position detection column
44: Position detection rack
100: Jig
110: Workpiece supporting member
111: Radial rack
112: Rotating roller (relative transfer means)
130: Central structure
200: Transfer mechanism
210: Transfer rail
220: Transfer loader unit
246: Rotation driving means
255: Rotation driving motor
300: Bring in/out section
400: Heating section
410: Jig supporting mechanism
440: Auxiliary cooling unit
450: Heating unit
451: Heating coil
452: Supporting box
460: Displacing means
461: Position adjusting handle
462: Vertical displacing unit
463: Horizontal displacing unit
464: Lower rack
465: Vertical driving mechanism
466: Displacement guide rod
467: Vertical displacement screw shaft
468: Displacement bearing
469: Vertical driving motor
471: Connecting body
472: First displacement rail
473: Upper rack
474: First displacement driving mechanism
475: Second displacement rail
476: Second displacement driving mechanism
477: Displacement driving motor
478: Horizontal displacement screw shaft
479: Displacement protrusion
480: Position detecting means
481: First expanding/contracting mechanism
482: Second expanding/contracting mechanism.
483: Radial position detector
484: Axial position detector
485: Driving means for expansion/contraction
486: Rod
487: Guide rod
488: Contactor
489: Variation detector
490: Posture control unit
491: Power adjusting means
492: Angle changing unit
493: Setting input unit
494: Arithmetic processing unit
495: Storage unit
496: Heating state evaluating unit
497: Driving control unit
500: Cooling section
520: Cooling jacket
600: Parts replacement section
700: Power feeding equipment
701: Mobile terminal
702: Cable
710: Operating unit
711: Input/output screen

What is claimed is:

1. An induction heating method for induction-heating a workpiece where areas to be heated are established extending in one direction, the deformation amount that appears on one edge of the areas to be heated when the areas to be heated are induction-heated being different from that on the other, comprising:
a heating process for allowing heating coils to face a portion of the areas to be heated and for heating the workpiece using the heating coils while the workpiece and the heating coils are made to move along the direction in a relative manner, and
detecting surface positions of the workpiece other than the areas to be heated during the heating period; correcting measurement positions obtained by detection result based at least on the shape of the workpiece; and changing relative positions and a relative angle between the workpiece and the heating coils so as to correspond to corrected positions obtained by the correction,
wherein the heating coils are disposed so as to follow the areas to be heated during heating period.

2. The induction heating method as set forth in claim 1, wherein the surface of the heating coils facing the areas to be heated is made to follow the areas to be heated during heating period.

* * * * *